United States Patent
Han

(10) Patent No.: US 10,848,203 B2
(45) Date of Patent: Nov. 24, 2020

(54) NFC DEVICE, NFC COMMUNICATION METHOD OF NFC DEVICE, AND SMART MAT INCLUDING NFC DEVICE

(71) Applicant: Daamdaam Samuso, Seoul (KR)

(72) Inventor: Junhee Han, Seoul (KR)

(73) Assignee: Daamdaam Samuso, Seoul (KR)

( * ) Notice: Subject to any disclaimer, the term of this patent is extended or adjusted under 35 U.S.C. 154(b) by 0 days.

(21) Appl. No.: 16/481,982

(22) PCT Filed: Feb. 9, 2017

(86) PCT No.: PCT/KR2017/001427
§ 371 (c)(1),
(2) Date: Jul. 30, 2019

(87) PCT Pub. No.: WO2018/147481
PCT Pub. Date: Aug. 16, 2018

(65) Prior Publication Data
US 2019/0393929 A1 Dec. 26, 2019

(30) Foreign Application Priority Data
Feb. 8, 2017 (KR) .................. 10-2017-0017623

(51) Int. Cl.
*H04B 5/00* (2006.01)
(52) U.S. Cl.
CPC ......... *H04B 5/0037* (2013.01); *H04B 5/0081* (2013.01)
(58) Field of Classification Search
CPC .... H04W 4/80; H04M 1/7253; G06K 7/0008; H04B 5/00
See application file for complete search history.

(56) References Cited

U.S. PATENT DOCUMENTS

| 2011/0221385 A1* | 9/2011 | Partovi | H02J 50/005 320/101 |
|---|---|---|---|
| 2014/0075075 A1 | 3/2014 | Morrill et al. | |

(Continued)

FOREIGN PATENT DOCUMENTS

| KR | 10-1998-0079485 A | 11/1998 |
|---|---|---|
| KR | 10-2009-0097619 A | 9/2009 |
| KR | 10-2011-0111275 A | 10/2011 |

OTHER PUBLICATIONS

"COWON SP5 Bluetooth Speaker Has Been Equipped with Wireless Charging and Alarm", Naver blog, Jun. 14, 2016, pp. 1 to 18, http://blog.naver.com/open8370?Redirect=Log&logNo=220735747261>.

(Continued)

*Primary Examiner* — Tuan Pham
(74) *Attorney, Agent, or Firm* — Edwin A. Sisson, Attorney at Law, LLC; Jeffrey J. Banyas

(57) ABSTRACT

According to one embodiment of the present specification, an NFC device can comprise: a loop antenna disposed on a first surface of a substrate and transmitting and receiving a wireless signal, wherein an antenna area defined by the outer perimeter or the inner perimeter of the loop antenna is positioned within a first area on the first surface; at least one input interface disposed on the first surface of the substrate, wherein the input interface is positioned within a second area on the first surface, and the first area and the second area are different from each other; and a processor connected to the loop antenna and the input interface. when a user input for the input interface is detected in a communication mode in which the processor can communicate with the external NFC device, the processor can transmit, to an external NFC device through the loop antenna, an RF response signal (Continued)

including control information for executing a function corresponding to the input interface.

11 Claims, 22 Drawing Sheets

(56) References Cited

U.S. PATENT DOCUMENTS

| | | | |
|---|---|---|---|
| 2015/0070832 A1 | 3/2015 | Schneider et al. | |
| 2019/0349718 A1* | 11/2019 | Kwon | H04W 4/08 |
| 2019/0349736 A1* | 11/2019 | Ilami | H04W 8/005 |

OTHER PUBLICATIONS

Kang, Seok O., "PLEOMAX, Released Stylish Wireless Keyboard—Wireless Mouse", DATANET, Oct. 19, 2009, pp. 1 to 2, http://www.datanet.co.kr/news/articlePrint.html?idxno=47395>.

"Sound Quality Review on Mark Levinson Docking Speaker HomeBoy Station", Naver blog, Mar. 25, 2014, pp. 1 to 14, http://blog.naver.com/iffu/90192520375>.

\* cited by examiner

【Figure 1】
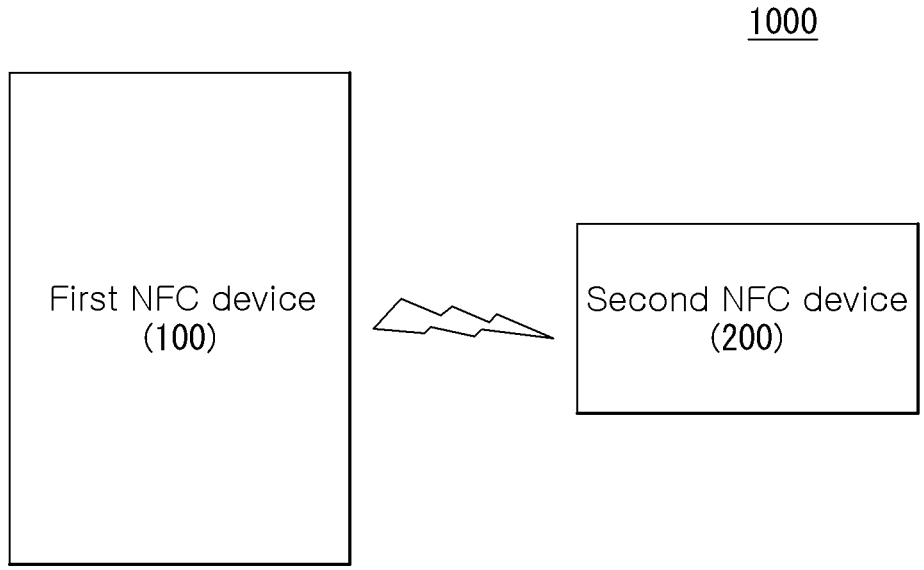
【Figure 2a】
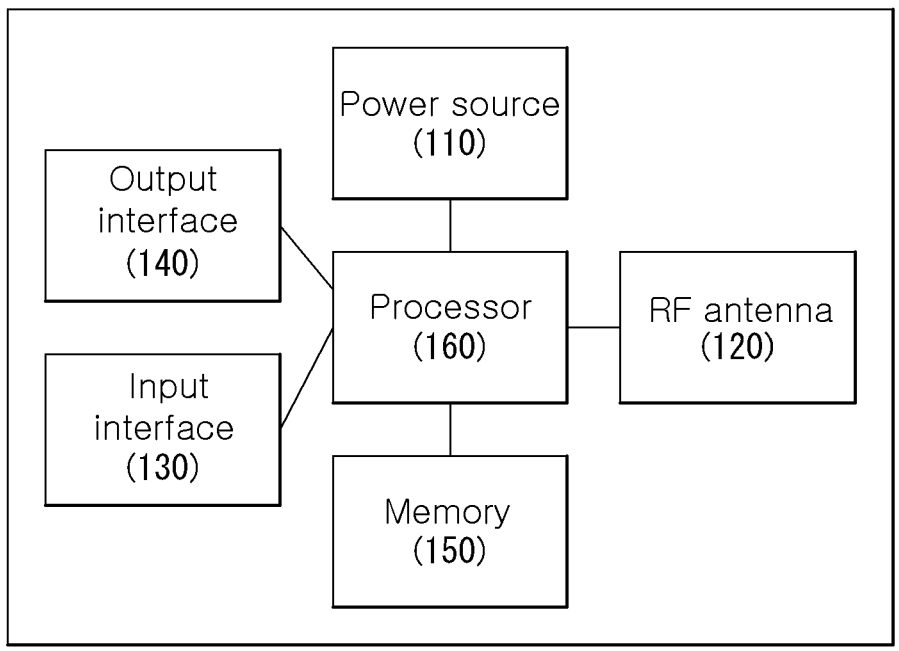

【Figure 2b】
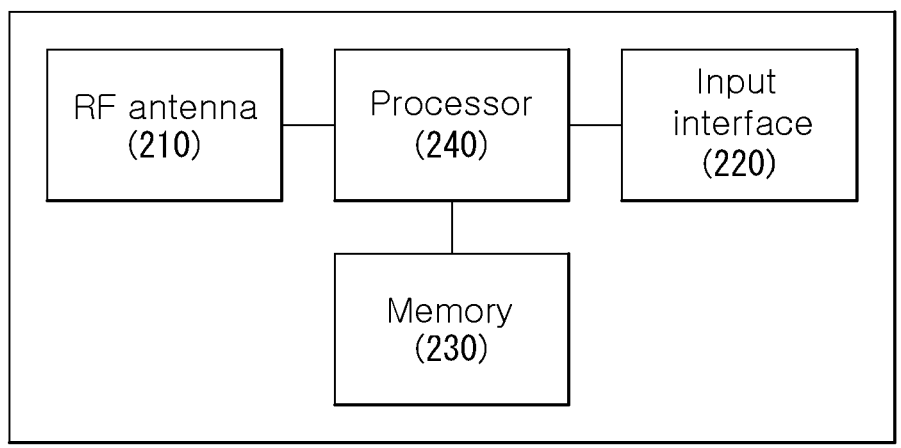
【Figure 3】
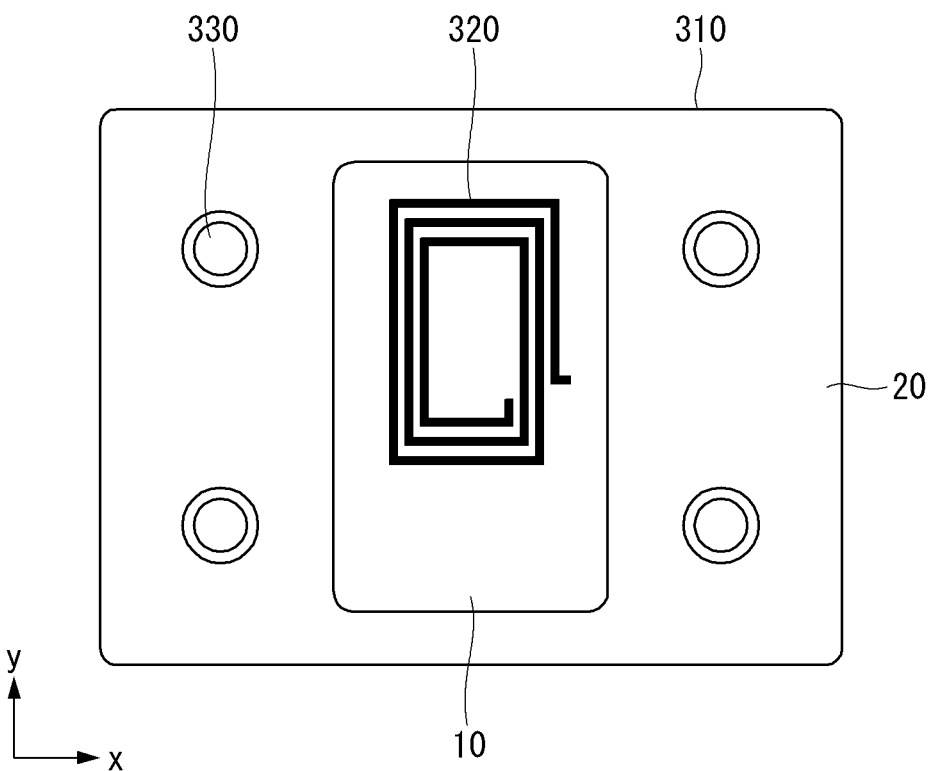

[Figure 4]
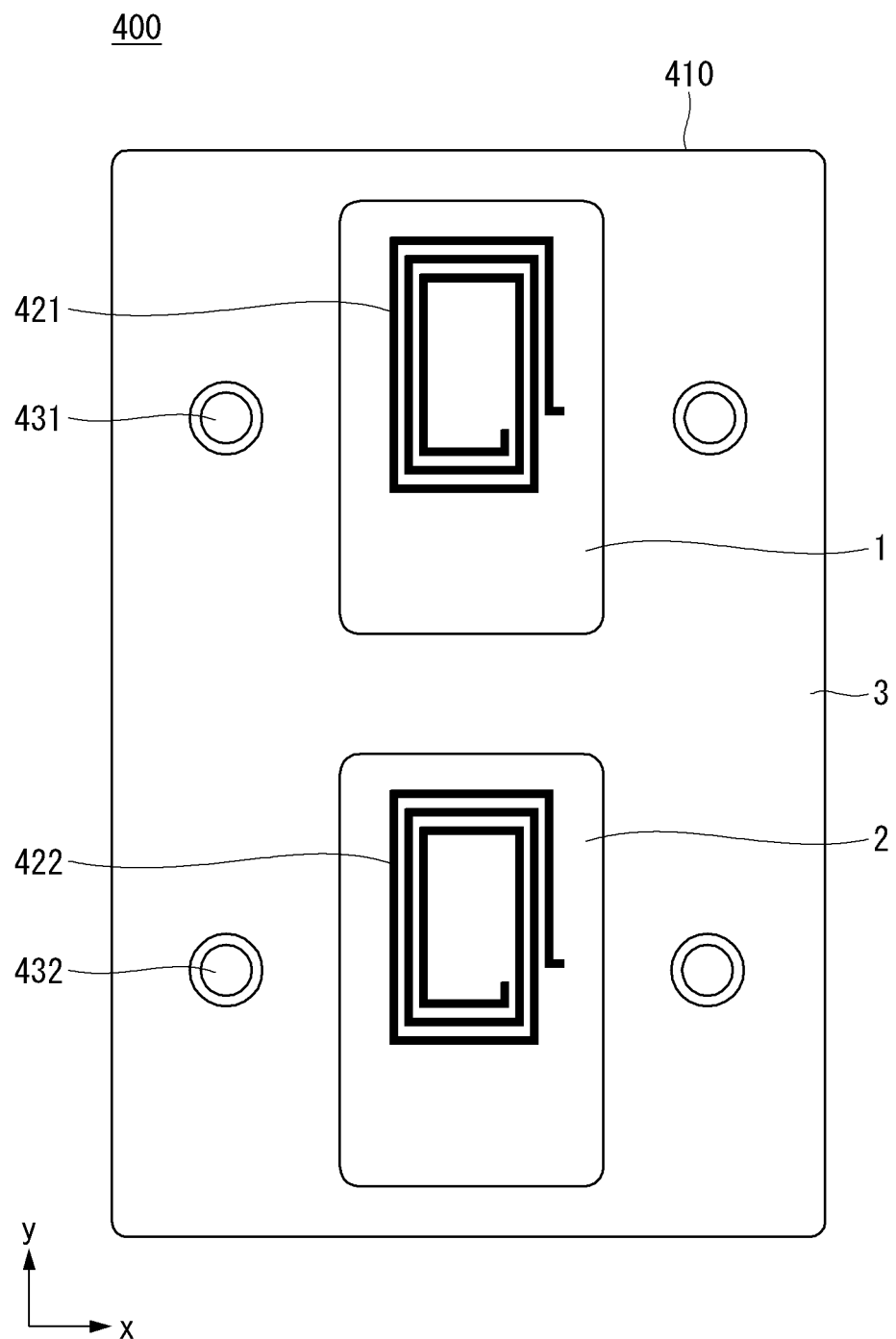

[Figure 5]
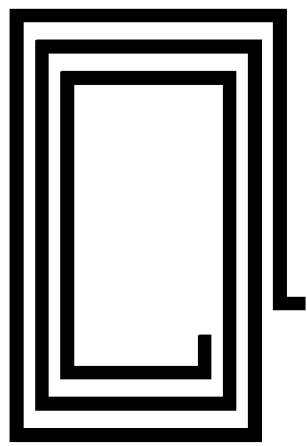
(a)
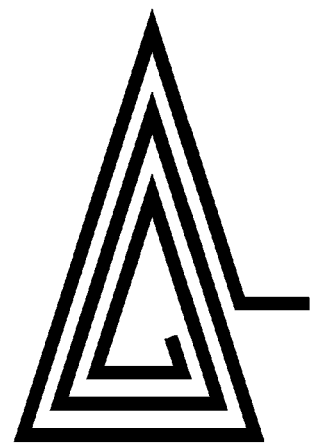
(b)
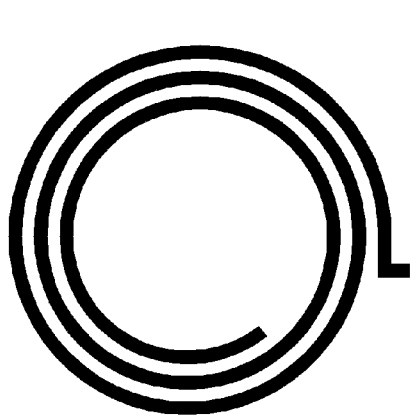
(c)
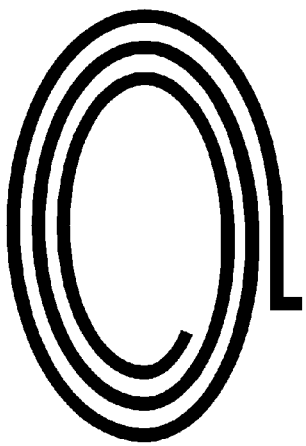
(d)

[Figure 6a]
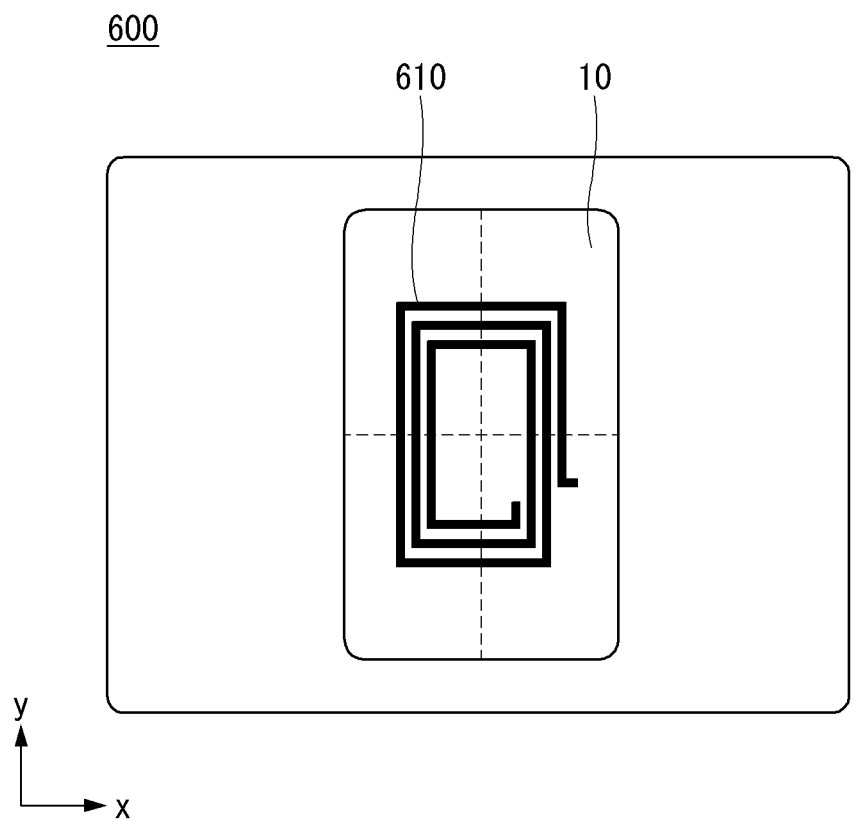

【Figure 6b】
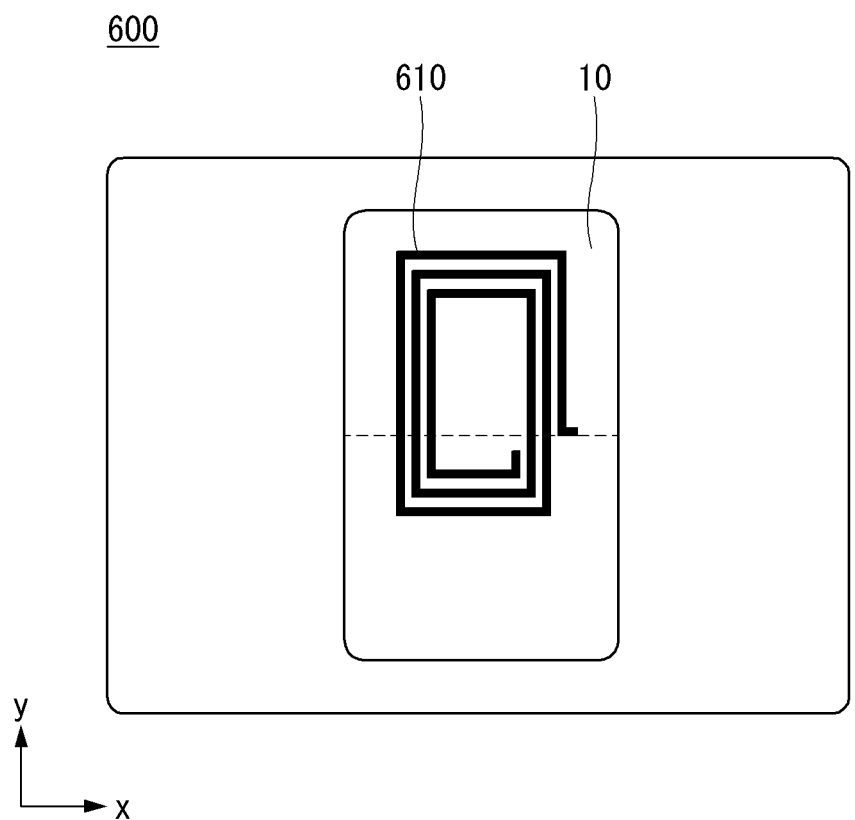

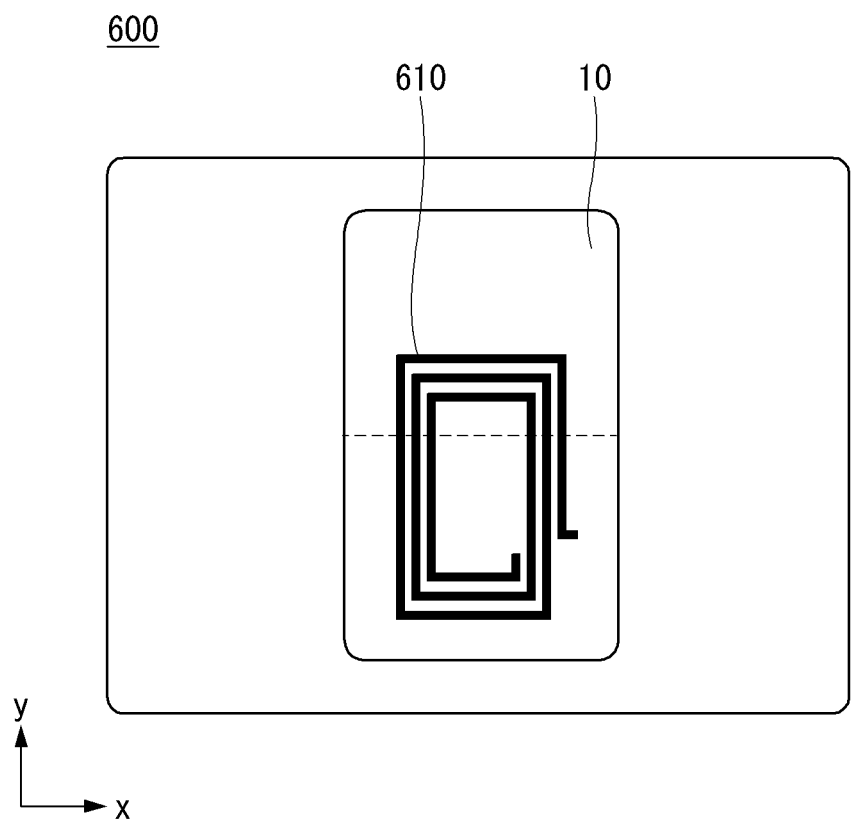
[Figure 6c]

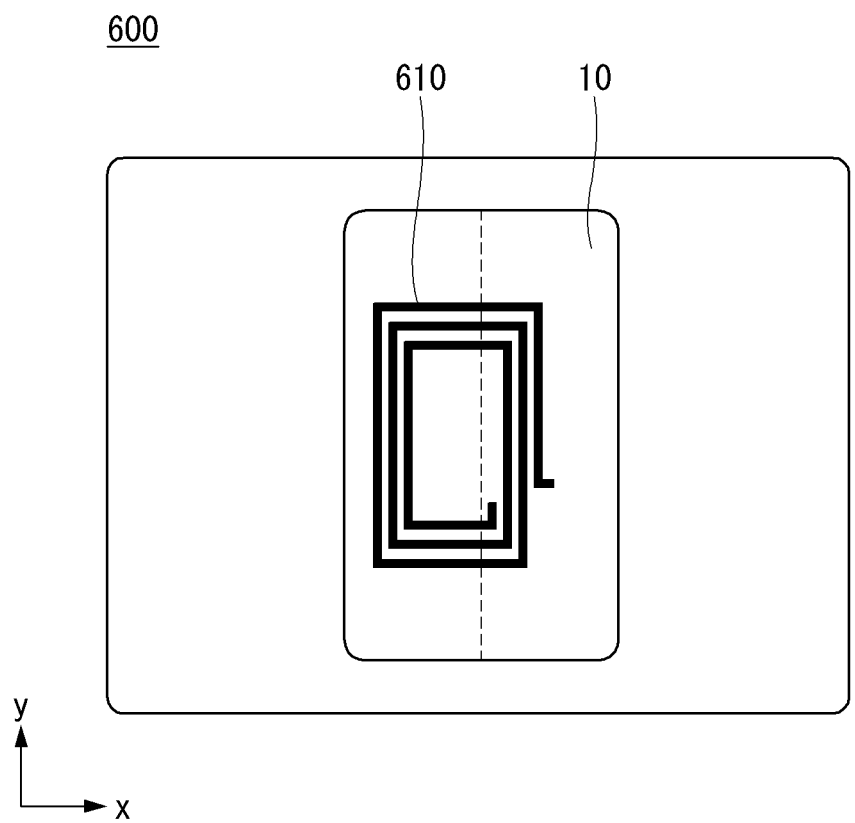
[Figure 6d]

【Figure 6e】
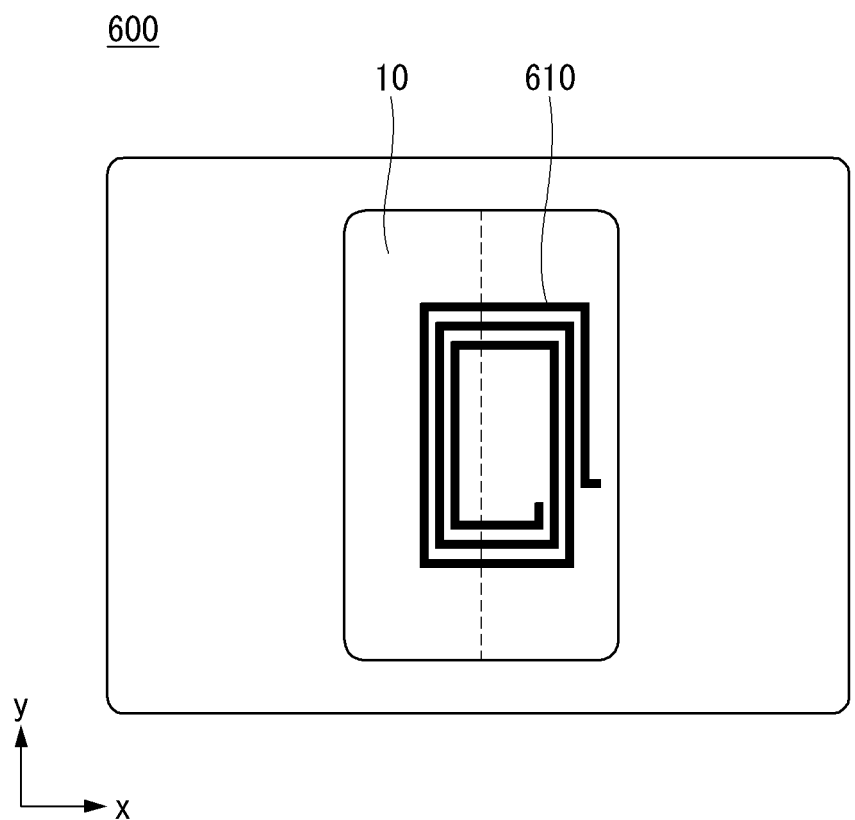

【Figure 7a】
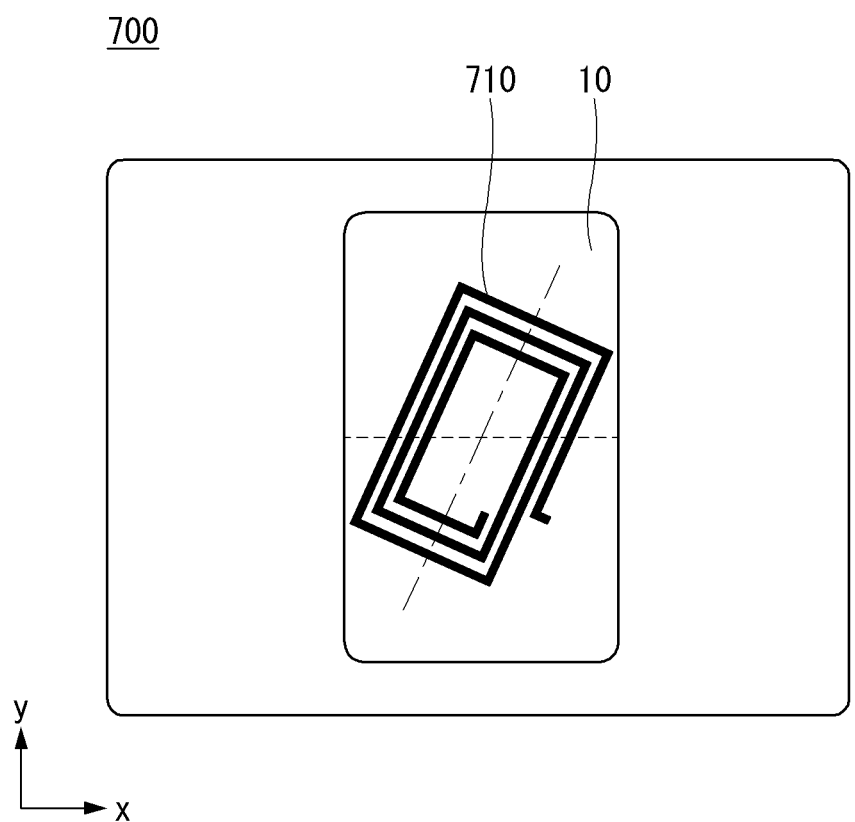

【Figure 7b】
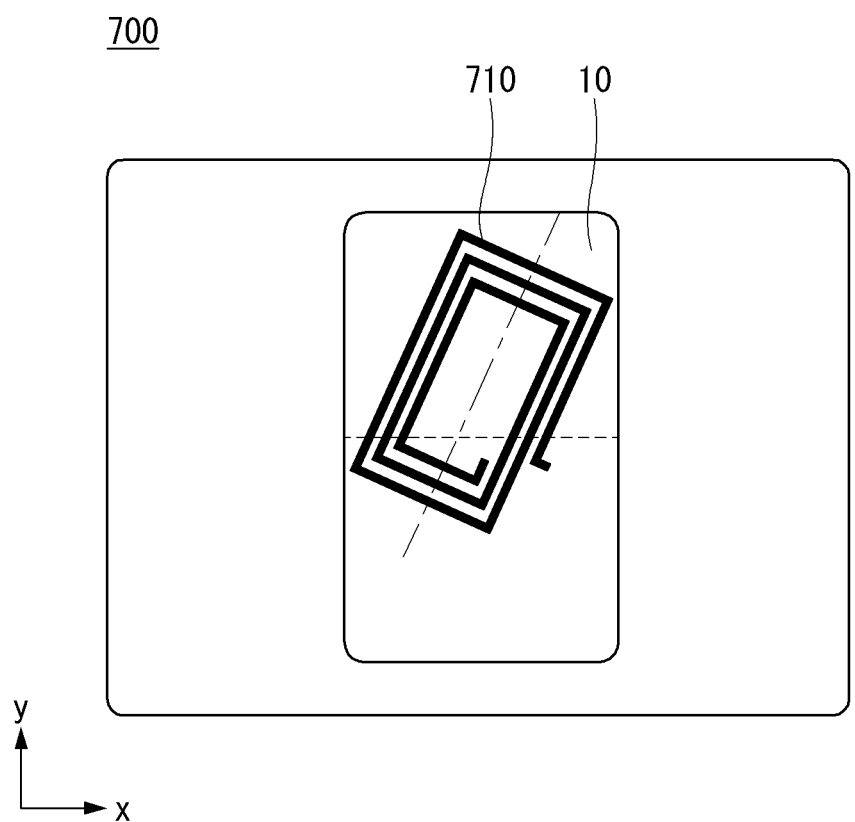

[Figure 7c]
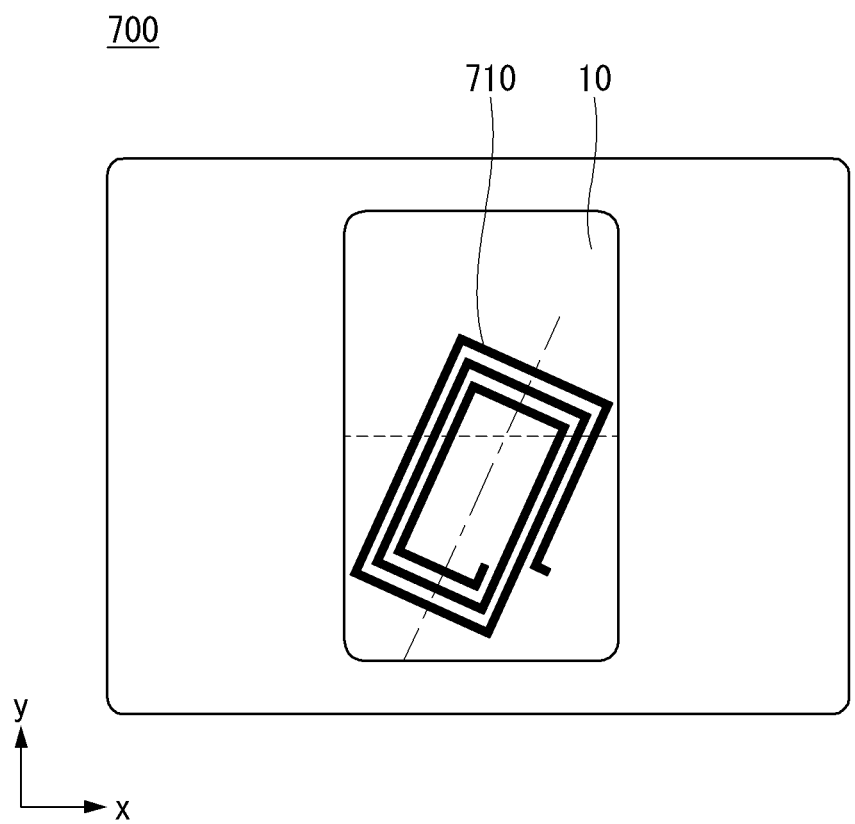

【Figure 7d】
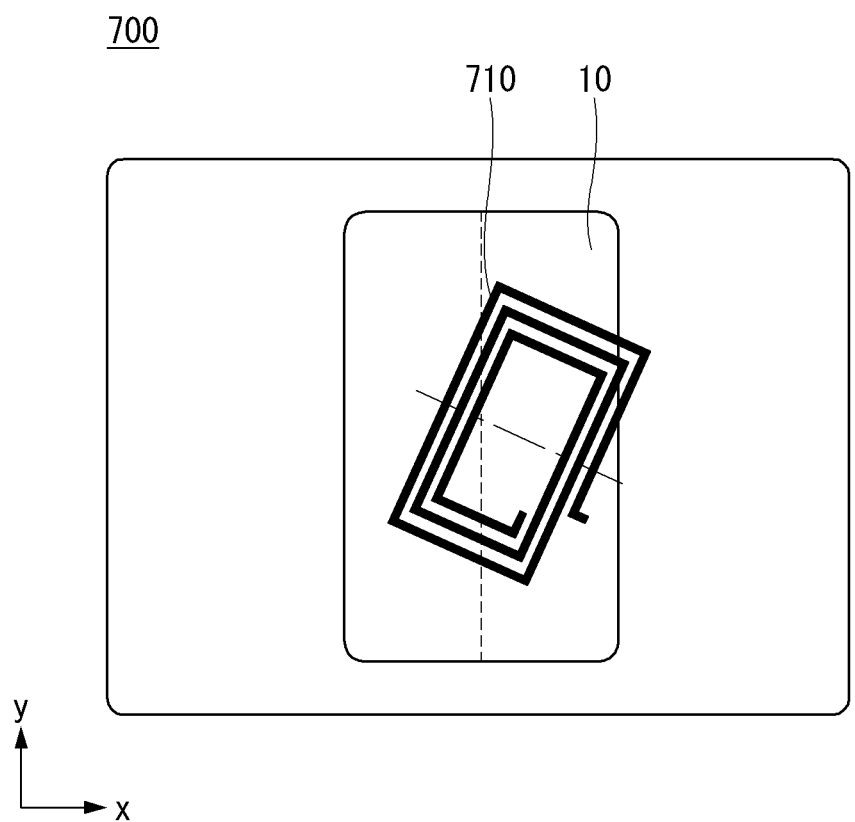

[Figure 7e]
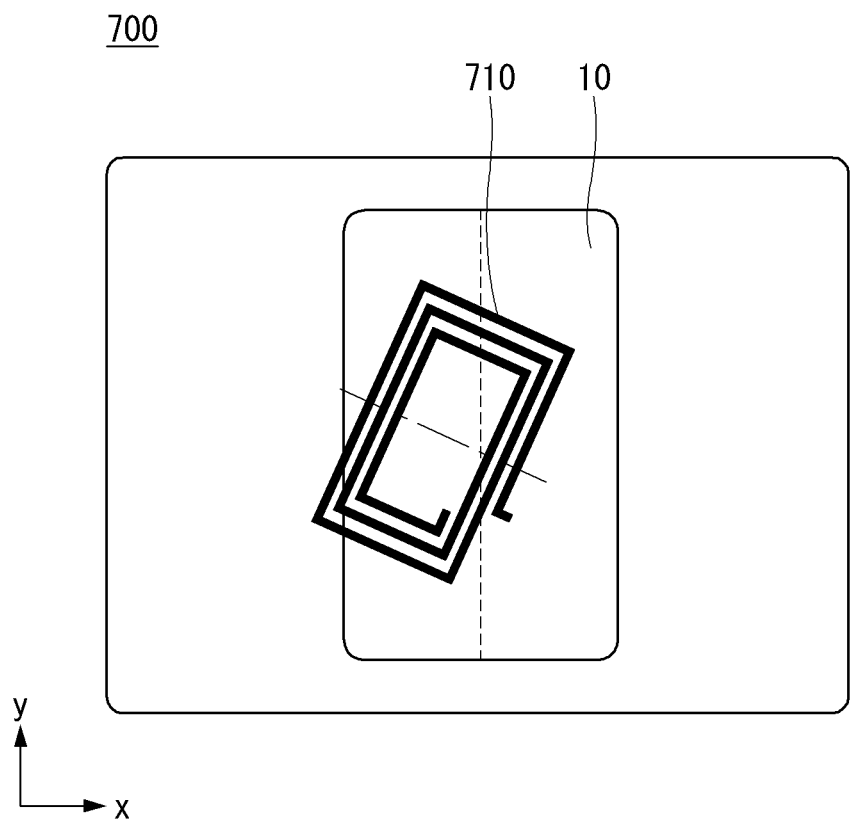
[Figure 8]
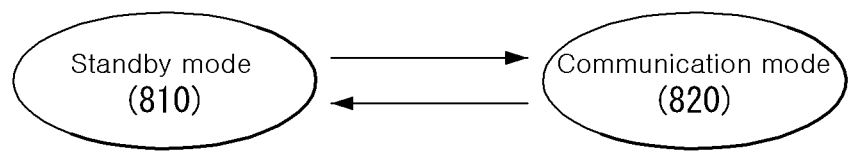

【Figure 9】
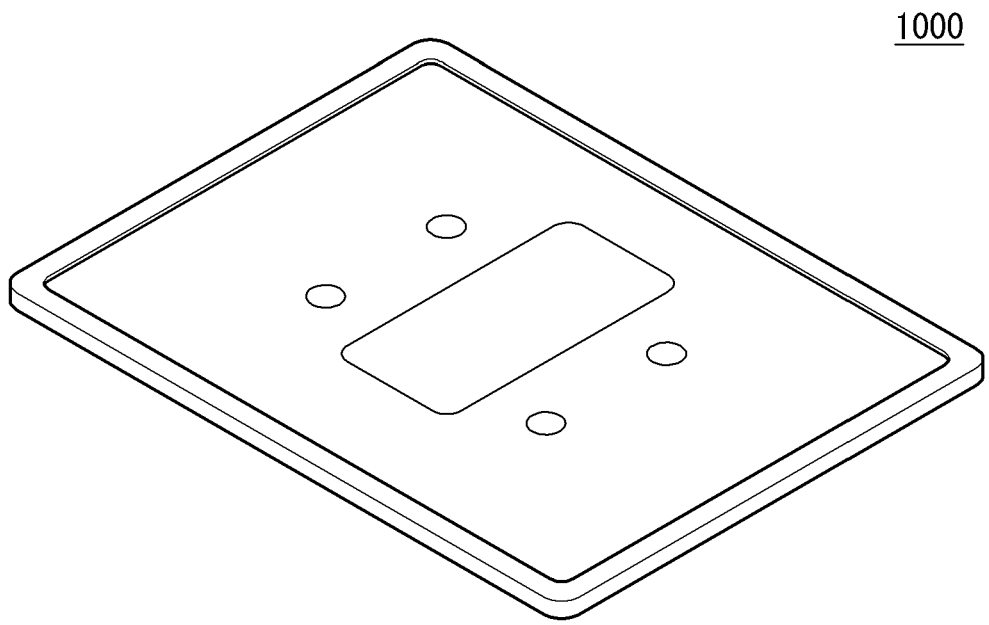

【Figure 10】
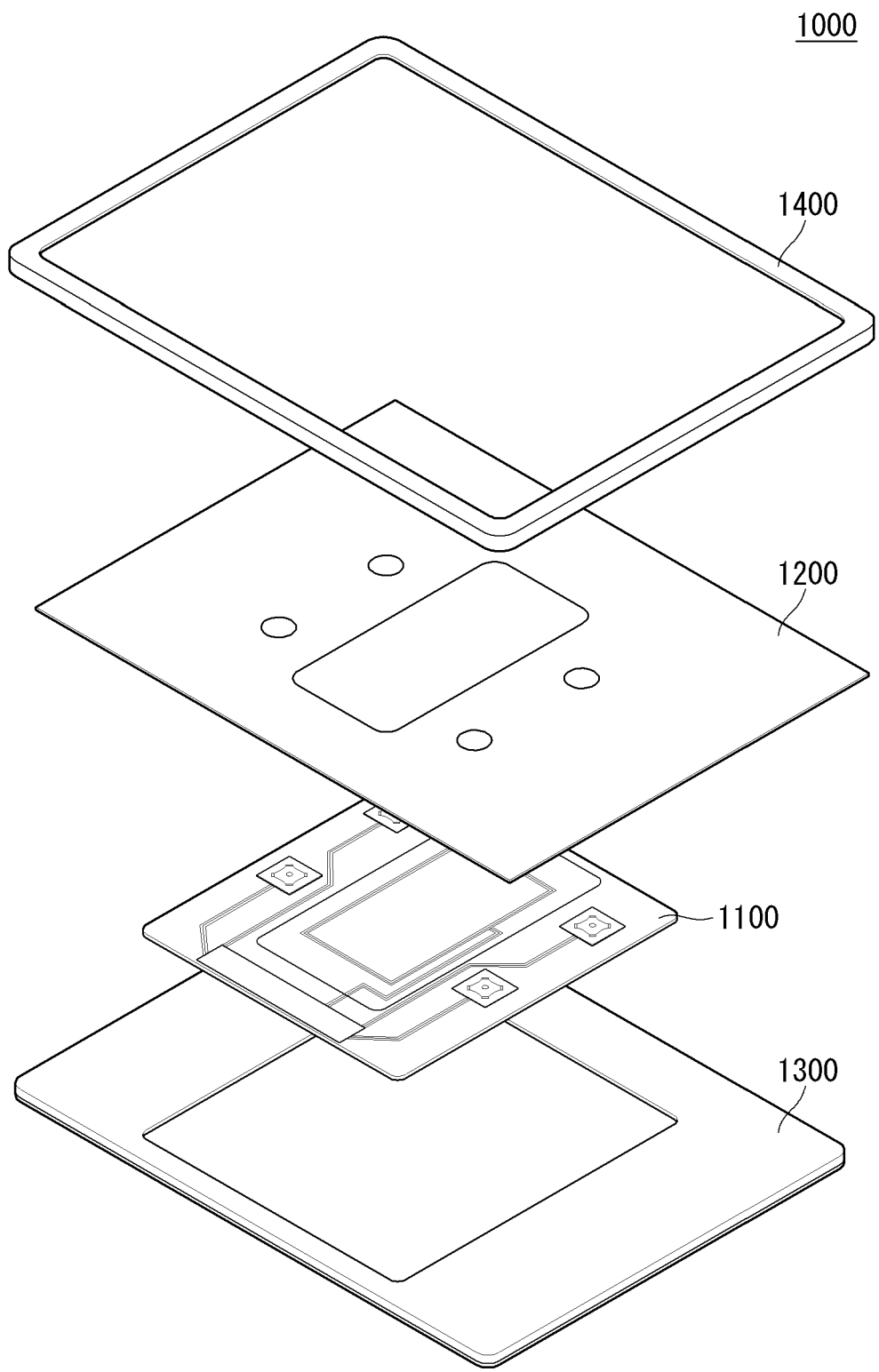

【Figure 11】
1000
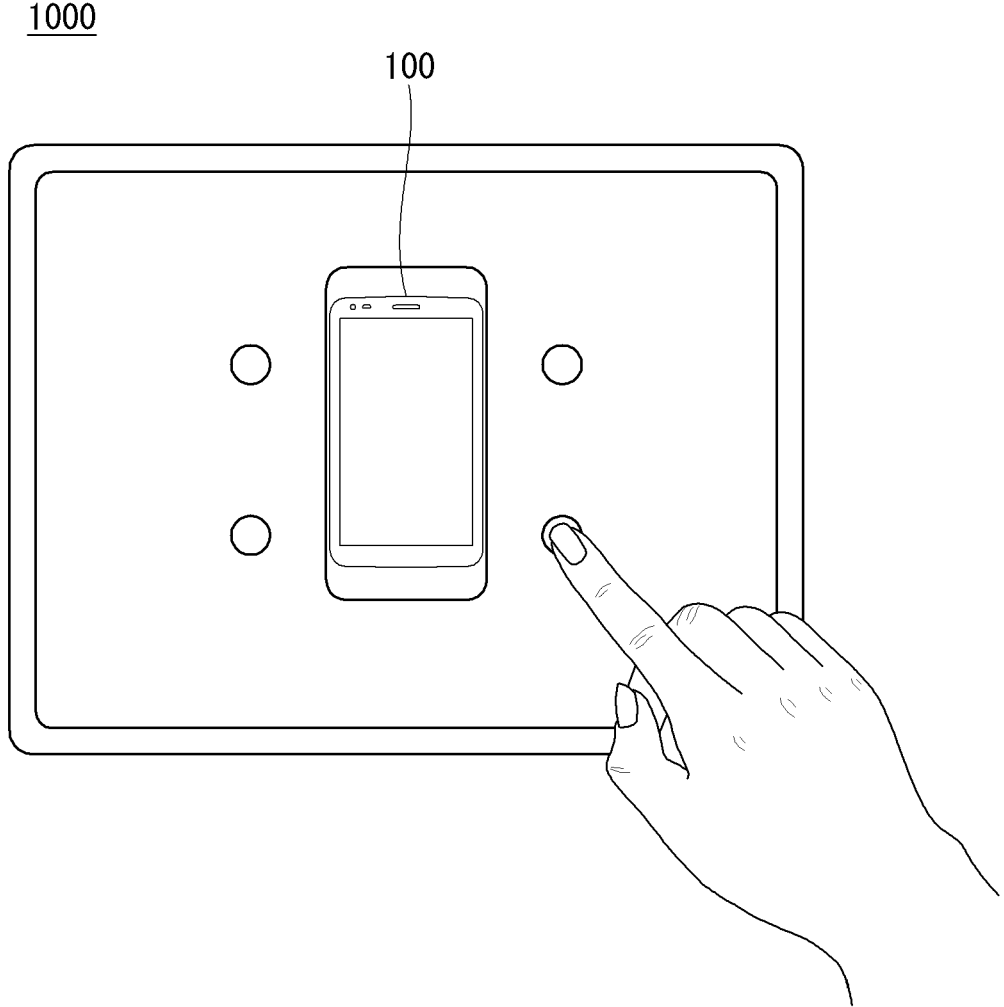

[Figure 12]
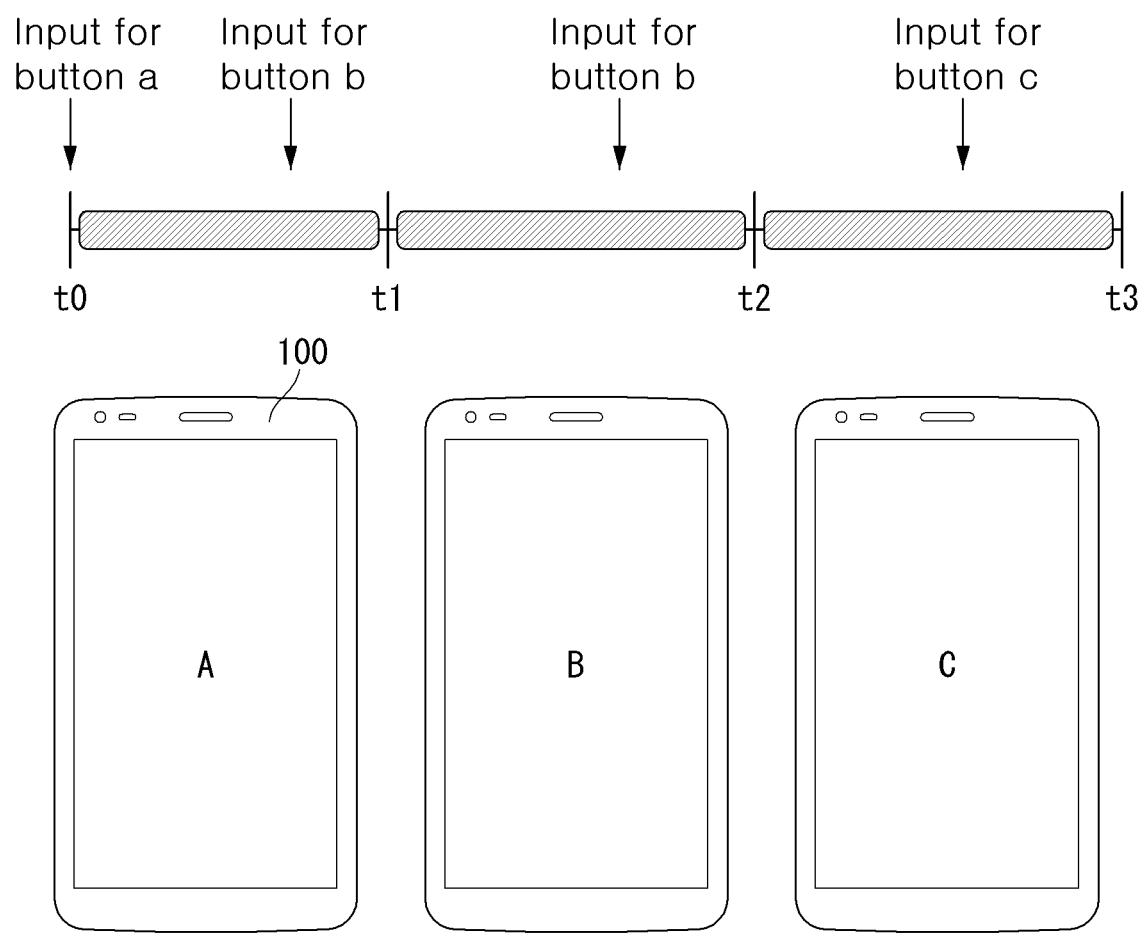

[Figure 13]
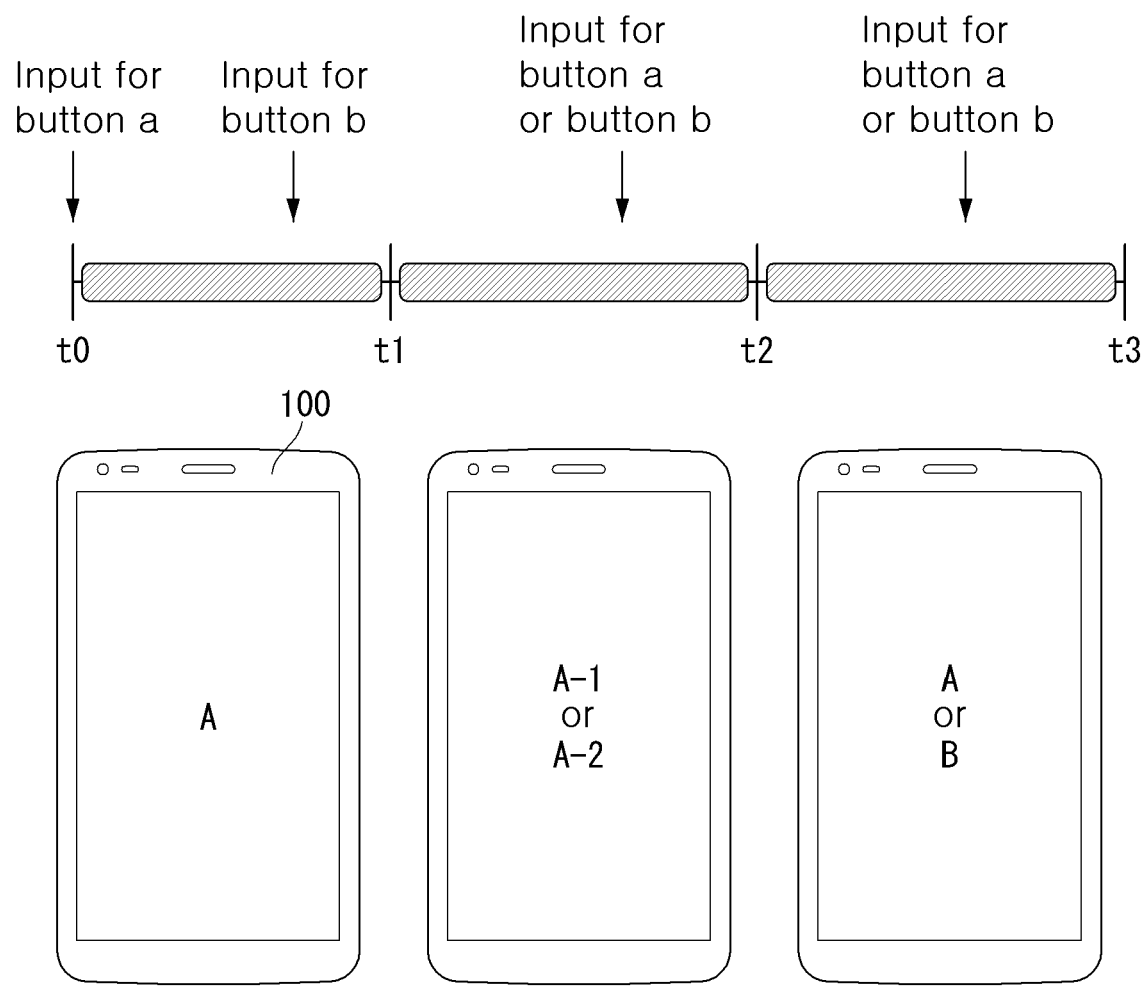

[Figure 14]
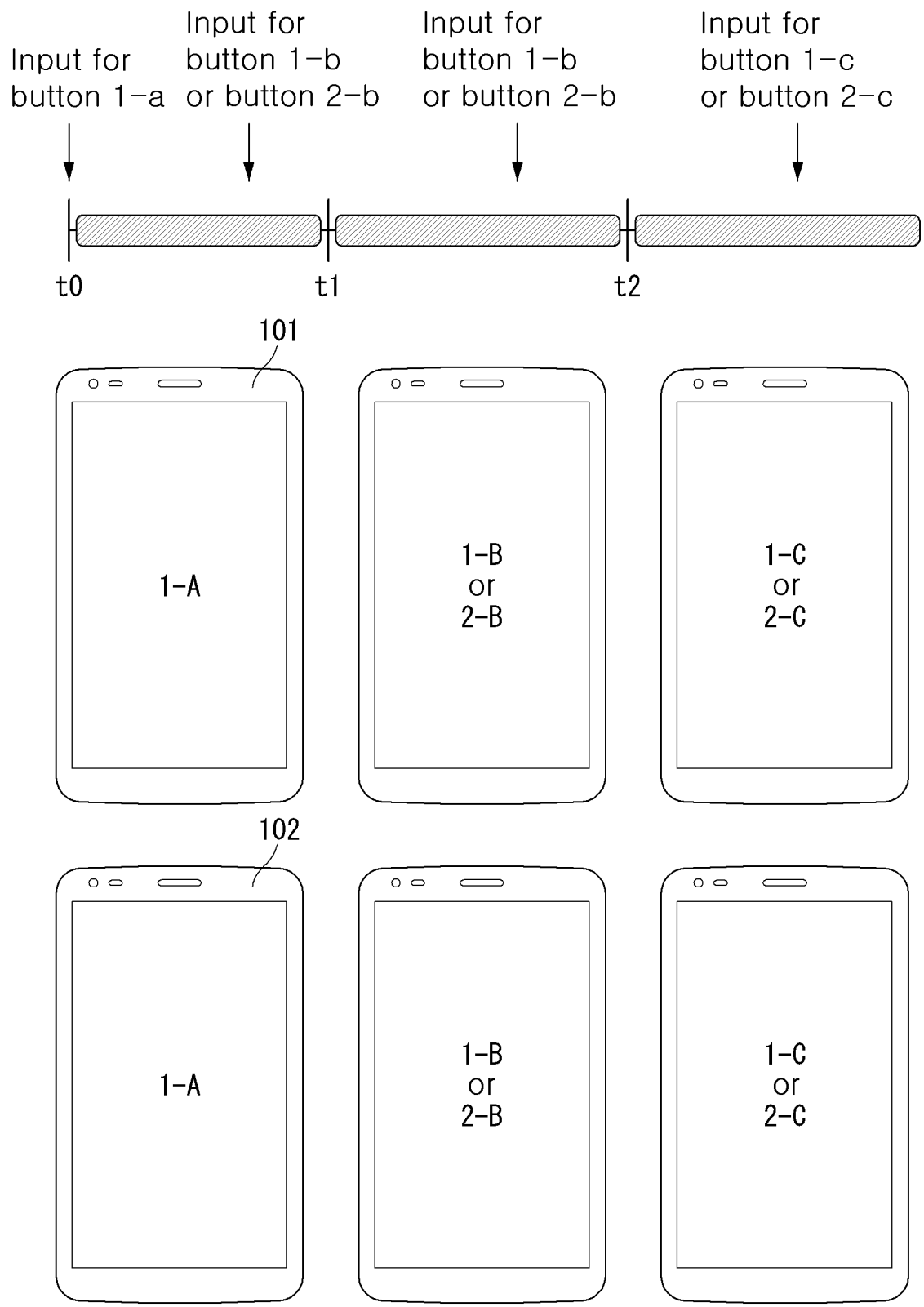

【Figure 15】
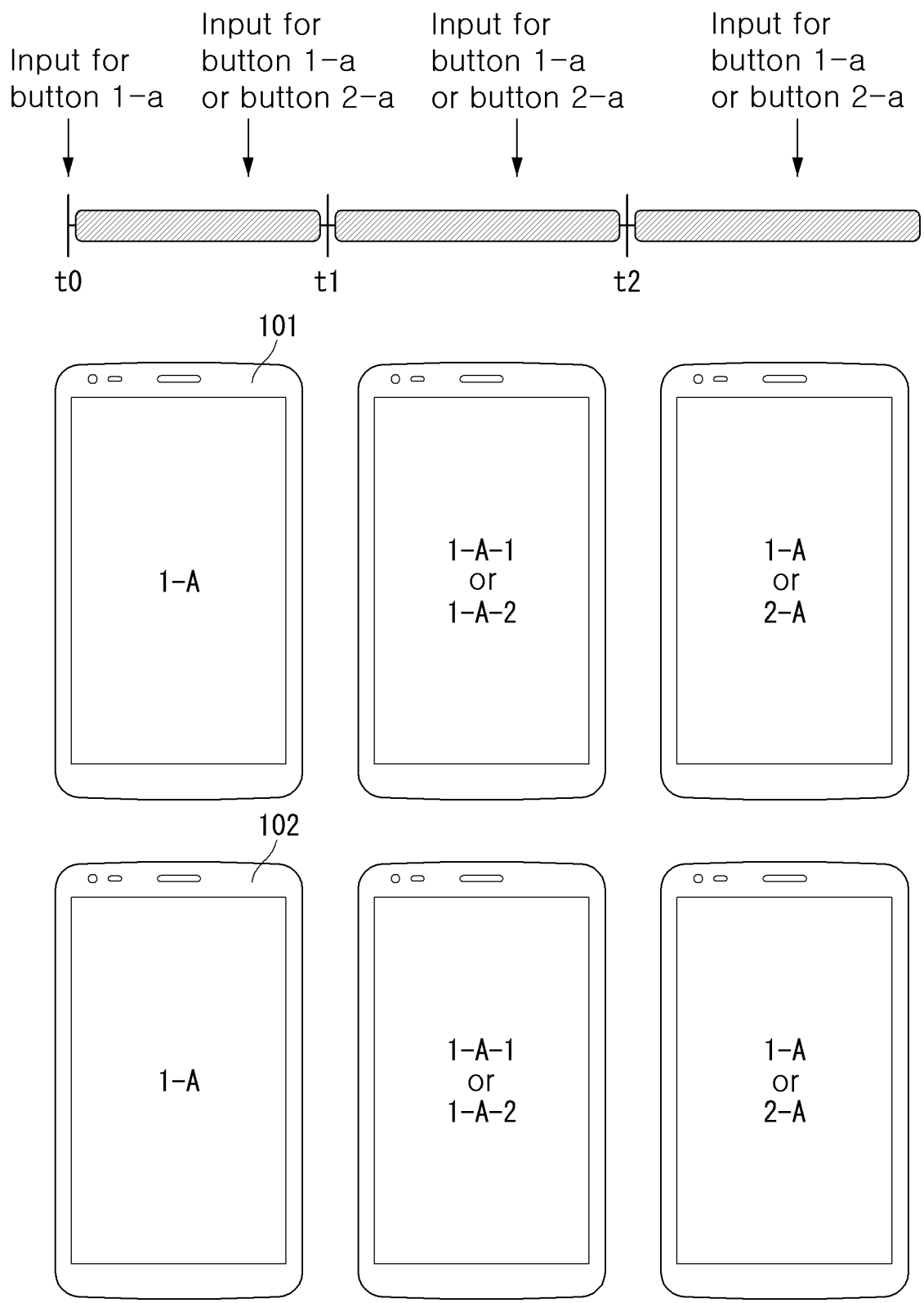

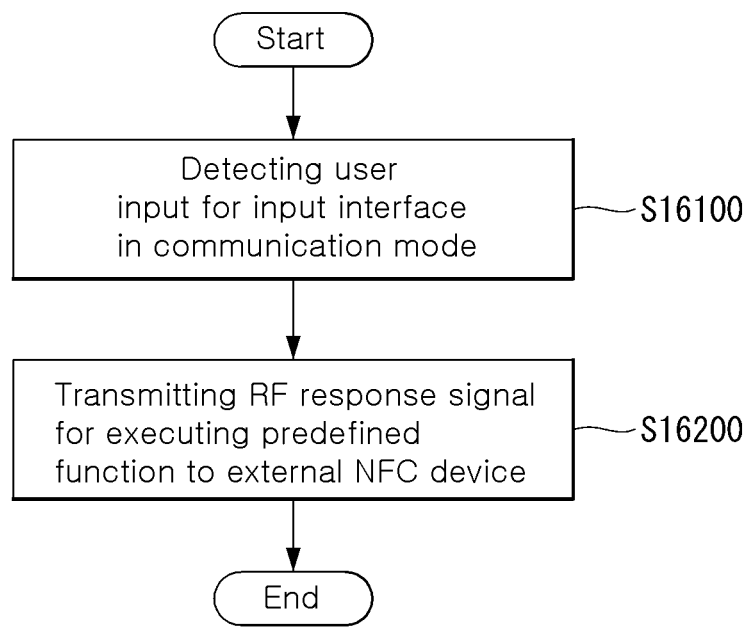
【Figure 16】

NFC DEVICE, NFC COMMUNICATION METHOD OF NFC DEVICE, AND SMART MAT INCLUDING NFC DEVICE

PRIORITIES AND CROSS REFERENCES

This Application claims priority from International Application No. PCT/KR2017/001427 filed on 9 Feb. 2017 and Korean Application No. 10-2017-0017623 filed on 8 Feb. 2017, the teachings of each of which are incorporated by reference herein in their entirety.

TECHNICAL FIELD

The present invention relates to a near field communication (NFC) technology, and more particularly, to an NFC device operating as an NFC target, an NFC communication method of the NFC device and a smart mat including the NFC device

BACKGROUND ART

Near field communication (NFC) is a short-range communication method based on the induction of electromagnetic waves. An NFC system adapted for NFC communication includes an NFC initiator that initiates communication and an NFC target performing the communication initiated by the NFC initiator.

Here, the NFC target is greatly influenced by antenna performance and communication efficiency according to the antenna location and layout structure of the NFC initiator. In addition, the NFC target just performs passive functions depending on the control of the NFC initiator.

TECHNICAL PROBLEMS TO BE SOLVED

Accordingly, there is demand for providing an efficient NFC device, of which the antenna location, configuration and layout structure are less influenced by the antenna location, configuration and layout structure of an NFC initiator, while operating as an NFC target. Moreover, there is also a need to provide an NFC device that performs active functions according to user's selection, while operating as an NFC target.

TECHNICAL SOLUTIONS

In accordance with an aspect of the present invention, the above and other objects can be accomplished by providing a near field communication (NFC) device including a loop antenna disposed on a first surface of a substrate and transmitting and receiving a wireless signal, wherein an antenna area defined by the outer perimeter or the inner perimeter of the loop antenna is positioned within a first area on the first surface, at least one input interface disposed on the first surface of the substrate, wherein the input interface is positioned within a second area on the first surface, and the first area and the second area are different from each other, and a processor connected to the loop antenna and the input interface. If a user input for the input interface is detected in a communication mode in which the processor can communicate with the external NFC device, the processor may transmit, to an external NFC device through the loop antenna, an RF response signal including control information for executing a function corresponding to the input interface.

In accordance with another aspect of the present invention, the above and other objects can be accomplished by providing a NFC communication method of an NFC device. In the NFC communication method, the NFC device may include a loop antenna disposed on a first surface of a substrate and transmitting and receiving a wireless signal, wherein an antenna area defined by the outer perimeter or the inner perimeter of the loop antenna is positioned within a first area on the first surface, at least one input interface disposed on the first surface of the substrate, wherein the input interface is positioned within a second area on the first surface, and the first area and the second area are different from each other, and a processor connected to the loop antenna and the input interface. The NFC communication method may include the steps of detecting a user input for the input interface in a communication mode in which the processor can communicate with the external NFC device, and if the user input for the input interface is detected, transmitting an RF response signal including control information for executing a predefined function to the external NFC device through the loop antenna.

ADVANTAGEOUS EFFECTS

As described above, according to the present disclosure, the NFC device includes at least one input interface, thereby operating as an NFC target that actively provides user's desired information according to user's selection, unlike a conventional NFC target, such as a powerless tag or a card, which simply provides only predetermined single information, irrespective of user's selection. As a result, even if the NFC device operates as a powerless (without the power source), passive NFC target, active NFC services can be provided according to user's selection and user-friendly NFC services can be provided.

In addition, according to the present disclosure, each input interface may be positioned at a different area from a loop antenna. Accordingly, even when the NFC device performs NFC communication with an external NFC device in a state in which the NFC device and the external NFC device come close to (or contact) each other, it is possible to prevent the input interface from being blocked by the external NFC device or to prevent the external NFC device from causing any inconvenience to the user input for the input interface.

In addition, since the NFC device includes a loop antenna positioned thereon and configured to be tilted a predetermined angle, the efficiency of communication with the external NFC device can be increased.

In addition, since the NFC device operates in communication modes including a general communication mode (that is, a first communication mode) and an extended communication mode (that is, a second communication mode), a variety of combinations of functions and information may be provided using a limited number of buttons. Moreover, the NFC device can gradually deliver more and more detailed information when a particular content is offered using the external NFC device.

BRIEF DESCRIPTION OF DRAWINGS

FIG. 1 is a conceptual diagram of an NFC communication system according to an embodiment of the present invention.

FIG. 2 is a block diagram of an NFC device according to an embodiment of the present invention.

FIG. 3 is a conceptual diagram of an NFC device including an RF antenna and an input interface according to an embodiment of the present invention.

FIG. 4 is a conceptual diagram of an NFC device including an RF antenna and an input interface according to another embodiment of the present invention.

FIG. 5 illustrates example types of a loop antenna according to an embodiment of the present invention.

FIG. 6 illustrates example layout structures of a loop antenna according to an embodiment of the present invention.

FIG. 7 illustrates example configurations of a loop antenna according to an embodiment of the present invention.

FIG. 8 illustrates an operation mode of an NFC device according to an embodiment of the present invention.

FIG. 9 is a conceptual diagram of a smart mat including an NFC device according to an embodiment of the present invention.

FIG. 10 is an exploded perspective view of the smart mat shown in FIG. 9.

FIG. 11 illustrates an example method of utilizing an NFC service using the smart mat shown in FIG. 9.

FIG. 12 illustrates operating methods of an NFC device according to an embodiment of the present invention and a smart mat including the NFC device in various communication modes.

FIG. 13 illustrates operating methods of an NFC device according to another embodiment of the present invention and a smart mat including the NFC device in various communication modes.

FIG. 14 illustrates operating methods of an NFC device including a plurality of loop antennas according to an embodiment of the present invention and a smart mat including the NFC device in various interoperation modes.

FIG. 15 illustrates operating methods of an NFC device including a plurality of loop antennas according to another embodiment of the present invention and a smart mat including the NFC device in various interoperation modes.

FIG. 16 is a flow diagram illustrating an NFC communication method of an NFC device according to an embodiment of the present invention and a smart mat including the NFC device.

BEST MODE FOR CARRYING OUT THE INVENTION

Hereinafter, description will be given in detail according to exemplary embodiments disclosed herein, with reference to the accompanying drawings. However, it should not be construed as being limited to the example embodiments set forth herein.

Although the terms used in the present invention are selected from generally known and used terms, terms used herein may be varied depending on operators intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of the terms.

In the specification of the present disclosure, the term "NFC device" means a device performing NFC communication with an external NFC device, and examples of the NFC device may include an NFC target performing NFC communication with an external NFC device, such as a smart phone, a smart pad, or the like. The smart mat is a device including the NFC device, and examples thereof may include an advertising device providing advertisement services using an NFC device or a device providing explanations of functions of new products in a showcase using an NFC device.

FIG. 1 is a conceptual diagram of an NFC communication system according to an embodiment of the present invention. Referring to FIG. 1, the NFC communication system 1000 includes a first NFC device 100 and a second NFC device 200. The first NFC device 100 and the second NFC device 200 may perform NFC communication in a short distance. In an embodiment, the first NFC device 100 and the second NFC device 200 may perform NFC communication in a contact state or in a non-contact state.

In an embodiment, the first NFC device 100 may be an NFC initiator and the second NFC device 200 may be an NFC target. In the present disclosure, the NFC initiator may be briefly referred to as an initiator and the NFC target may be briefly referred to as a target.

The NFC initiator means an NFC device that initiates and controls NFC communication. In an embodiment, the NFC initiator may initially output electromagnetic waves to initiate NFC communication. In this case, a wavelength of a usable frequency may be, for example, 13.56 MHz, but not limited thereto. Wavelengths of a variety of usable frequencies can be employed. The NFC initiator can actively generate electromagnetic waves (or RF field) to supply power to the passive NFC target. In such a way, the NFC initiator allows the NFC target to have a simpler form factor such as, for example, a powerless tag, a sticker, or a card.

In an embodiment, the NFC initiator may perform transmission speed selection, initialization and/or SDD (Single Device Detection) process. In addition, the NFC initiator may further perform a collision avoidance procedure by detecting an external RF field before generating the RF field.

The NFC target means an NFC device that performs NFC communication with the NFC initiator under the control of the NFC initiator. In an embodiment, the NFC target may be a passive NFC target that receives an operating voltage from an RF field (or an RF signal) generated from the NFC initiator or an active NFC target that actively generates an RF field (or an RF signal).

In an embodiment, the NFC communication between the NFC initiator and the NFC target may be performed such that the NFC initiator transmits an RF signal including a command (e.g., a read command or a write command) to the NFC target and the NFC target transmits an RF response signal including a response to the command to the NFC initiator.

FIG. 2 is a block diagram of an NFC device according to an embodiment of the present invention. Specifically, FIG. 2A is an example block diagram of the first NFC device 100 operating as an NFC initiator, and FIG. 2B is an example block diagram of the second NFC device 200 operating as an NFC target. As shown, the first NFC device 100 of the embodiment shown in FIG. 2A may be an NFC device with a power source, and the second NFC device 200 of the embodiment shown in FIG. 2B may be an NFC device without a power source.

Referring to FIG. 2A, the first NFC device 100 may include a power source 110, an RF antenna 120, at least one input interface 130, at least one output interface 140, a memory 150 and a processor 160.

In the embodiment shown in FIG. 2A, the first NFC device 100, which is an NFC device with the power source, may actively generate an RF signal that initiates NFC communication and may supply an operating voltage to a passive NFC target through the RF signal. Therefore, the first NFC device 100 may operate as an NFC initiator. In alternative embodiments, the first NFC device 100 may also operate as an NFC target. In this case, another NFC device performing NFC communication with the first NFC device 100 operating as the NFC target should be NFC device with the power source that actively generates an RF signal.

The power source 110, which is connected to the processor 160, may supply an operating voltage to the processor 160.

The RF antenna 120, which is connected to the processor 160, may transmit/receive a wireless signal (e.g., an RF signal) to/from the processor 160. In an embodiment, the RF antenna 120 may be a loop antenna implemented as a coil having a loop shape. The location and shape of the loop antenna will later be described with reference to FIGS. 3 to 7.

The input interface 130, which is connected to the processor 160, may receive a user input. In an embodiment, the input interface 130 may include, for example, a control button receiving user's button input, a mike receiving a user's audio input, or a touch display panel receiving a user's touch input. In an embodiment, the control button may be a touch button recognizing a user's touch input or a physical button recognizing a user's press input, but not limited thereto. Various types of buttons recognizing user's inputs can be used as the control button.

The output interface 140 may output information. In an embodiment, the output interface 140 may include, for example, a display outputting visual information, a speaker outputting audio information, and so on.

The memory 150, which is connected to the processor 160, may store various types of information for driving the processor 160. The memory 150 may be incorporated into the processor 160 or may be installed outside the processor 160 to then be connected to the processor 160 by known means.

The processor 160, which is connected to the power source 110, the RF antenna 120, the input interface 130, the output interface 140 and the memory 150, may be configured to perform various example operations of the NFC device. For example, the processor 160 may be configured to allow the NFC device to perform various operations of the NFC initiator or the NFC target. In an embodiment, at least one of a module, data, a program or software for implementing various example operations of the NFC device may be stored in the memory 150 to then be executed by the processor 160.

Referring to FIG. 2B, the second NFC device 200 may include an RF antenna 210, at least one input interface 220, a memory 230 and a processor 240.

In the embodiment shown in FIG. 2B, the second NFC device 200 may be an NFC device without a power source and may receive an operating voltage from the RF signal generated from the first NFC device 100 (e.g., the NFC initiator). The second NFC device 200 may be incapable of actively generating the RF signal for initiating NFC communication but may be capable of generating an RF response signal by modulating the RF signal received from the external NFC device. Therefore, the second NFC device 200 may operate as only the NFC target.

The operations performed by the RF antenna 210, the input interface 220 and the memory 230 of the second NFC device 200 shown in FIG. 2B are identical or similar to the operations performed by the RF antenna 120, the input interface 130 and the memory 150 of the first NFC device 100 shown in FIG. 2B, respectively, and repeated descriptions will be omitted. Hereinafter, the processor 240 will be briefly described.

In the embodiment shown in FIG. 2B, the processor 240 may be connected to the RF antenna 210, the input interface 220 and the memory 230 to then perform various example operations of the NFC device. For example, the processor 240 may be configured to allow the NFC device to perform various operations of the NFC target. In an embodiment, at least one of a module, data, a program or software for implementing various example operations of the NFC device may be stored in the memory 230 to then be executed by the processor 240.

The aforementioned operations of the processors shown in FIG. 2 will now be described in more detail with reference to various drawings. In the following description, the processor may be represented to control at least one unit included in the NFC device or the NFC device, and the processor and the NFC device may be regarded as the same unit. FIG. 2 is diagram illustrating various blocks of the NFC device according to an embodiment of the present invention, and the respective blocks of the NFC device are illustrated as logically separate elements. Therefore, the elements of the NFC device may be mounted in a single chip or multiple chips according to the design of the NFC device.

Hereinafter, the NFC device according to an embodiment of the present invention, which operates as an NFC target, will be described in detail. The NFC device according to an embodiment of the present invention may be implemented as the NFC device with the power source or the NFC device without the power source. Preferably, the NFC device according to an embodiment of the present invention may be implemented as the NFC device without the power source. In this case, the NFC device may operate as only the NFC target. However, the NFC device may have several advantages, including a simplified structure and a low manufacturing cost. In the following embodiments, the first NFC device operating as the NFC target may be referred to as the NFC device, and second NFC device operating as the NFC initiator may be referred to as the external NFC device.

FIG. 3 is a conceptual diagram of an NFC device including an RF antenna and an input interface according to an embodiment of the present invention. Specifically, FIG. 3 is a conceptual diagram of an NFC device 300 including a single RF antenna.

Referring to FIG. 3, the NFC device 300 may include a board 310 (or an NFC board) on which the single RF antenna and at least one input interface 330 are disposed. In an embodiment, the board 310 may be, for example, a PCB Printed Circuit Board) board 310. In an embodiment, the RF antenna may be, for example, a loop antenna 320 implemented as a coil having a predefined number of turns, that is, one or more turns.

In an embodiment, the input interface may be, for example, a control button receiving a user input. As described above, the control button may be, for example, a touch button recognizing a user's touch input or a physical button recognizing a user's press input. The input interface 330 may have various shapes. For example, as shown, the input interface 330 may have a circular shape.

In the embodiment shown in FIG. 3, the loop antenna 320 may be disposed on a first surface of the board 310. In an embodiment, an antenna area of the loop antenna 320 may be positioned within a first area 10 on the first surface of the board 310. Here, the antenna area, which is an area associated with the loop antenna 320, may be, for example, an area defined or determined by an outer perimeter or an inner perimeter of the loop antenna 320.

Here, the first area may be an area with which the external NFC device is aligned for NFC communication. In this case, the external NFC device may be aligned with the first area in a contact state or in a non-contact state. As a result, in a state in which the external NFC device is aligned with the first area 10, a loop antenna having the optimized location, configuration and layout structure, which offers maximum antenna efficiency and best communication efficiency, can be used as the loop antenna 320 of the NFC device 300.

In an embodiment, the shape of the first area may be identical or similar to the shape of the external NFC device. For example, if the external NFC device is shaped of a rectangle having a breadth (or width) larger than a length (or height), the first area may also be shaped of a rectangle having a breadth larger than a length. In an embodiment, the first area may be wider than a device area of the external NFC device. Here, the device area, which is an area associated with the external NFC device, may be, for example, an area defined or determined by a frame of the external NFC device.

In an embodiment, the external NFC device may be aligned with the first area in a predetermined direction. For example, the external NFC device may be aligned with the first area, such that a vertical axis of the external NFC device becomes parallel with a vertical axis of the first area in the same direction. That is to say, the external NFC device may be positioned such that the vertical axis of the external NFC device becomes parallel with the vertical axis of the first area, and an upper part of the external NFC device faces an upper part of the first area.

In addition, in the embodiment shown in FIG. 3, the respective input interfaces 330 may be disposed on the first surface of the board 310. In an embodiment, an area of the input interface 330 (i.e., an input interface area) may be positioned within a second area 20 on the first surface of the board 310. In this case, the input interface area may be defined by the outer perimeter of the input interface 330. Here, the second area 20 may be different from the first area 10. That is to say, the loop antenna 320 and the input interfaces 330 may be positioned at different areas. Accordingly, when NFC communication is performed in a state in which the external NFC device is aligned with the first area 320 of the NFC device 300, the input interface 330 may not be blocked by the external NFC device 300, and the external NFC device 300 may be prevented from causing any inconvenience to the user input for the input interface 330.

As described above with reference to FIG. 2, an RF antenna and input interfaces may be connected to a processor. For example, two end points of the loop antenna 320 may be connected to the processor in a wired manner, and the respective input interfaces 330 may be connected to the processor in a wired manner. In this case, if a user input for the input interface 330 is detected in a communication mode, the processor can transmit, to an external NFC device through the loop antenna 320, an RF response signal including control information for executing a predefined function (e.g., a function corresponding to the input interface from which the user input is detected). Here, the communication mode means one of operation modes of the NFC device 300, indicating that the NFC device 300 is in a state in which it can communicate with the external NFC device.

As described above, since the NFC device 300 according to the present disclosure includes at least one input interface, it may operate as an NFC target that actively provides user's desired information according to user's selection, unlike a conventional NFC target, such as a powerless tag or a card, which simply provides only predetermined single information, irrespective of user's selection. As a result, even if the NFC device operates as a powerless(without the power source), passive NFC target, active NFC services can be provided according to user's selection and user-friendly NFC services can be provided.

FIG. 4 is a conceptual diagram of an NFC device including an RF antenna and an input interface according to another embodiment of the present invention. Specifically, FIG. 4 is a conceptual diagram of an NFC device 400 including multiple RF antennas. In FIG. 4, overlapping descriptions of the content disclosed in FIG. 3 will be omitted.

Referring to FIG. 4, the NFC device 400 may include a board 410 (or an NFC board) on which multiple RF antennas and at least one input interface, are disposed. For example, the NFC device 400 may include a first loop antenna 421, a second loop antenna 422, at least one first input interface 431 associated with the first loop antenna 421, and at least one second input interface 432 associated with the second loop antenna 422. In this case, the respective loop antennas may perform different NFC communications from the external NFC device.

In the embodiment shown in FIG. 4, the first loop antenna 421 and the second loop antenna 422 may be disposed on a first surface of the board 410. In an embodiment, a first antenna area of the first loop antenna 421 may be positioned on a first area 1 on the first surface of the board 410, and a second antenna area of the second loop antenna 422 may be positioned on a second area 2 on the first surface of the board 410. As described above with reference to FIG. 3, the antenna area, which is an area associated with the loop antenna, may be, for example, an area defined or determined by an outer perimeter or an inner perimeter of the loop antenna 320.

Here, the first area 1 may be an area with which a first external NFC device is aligned for NFC communication. In addition, the second area 2 may be an area with which a second external NFC device is aligned for NFC communication. As described above with reference to FIG. 3, the shapes of the first area 1 and the second area 2 may be identical or similar to the shapes of the first and second external NFC devices, respectively. In addition, the first external NFC device and the second external NFC device may be aligned with the first area 1 and the second area 2 in predetermined directions, respectively.

In addition, in the embodiment shown in FIG. 4, the respective input interfaces may be disposed on the first surface of the board 410. In an embodiment, an area for the input interfaces (input interface area) may be positioned within a third area 3 on the first surface of the board 410. In this case, the input interface area may be, for example, an area defined or determined by outer perimeters of the input interfaces. Here, the third area 3 may be a different area from the first area 1 and the second area 2. That is to say, the first loop antenna 421, the second loop antenna 422 and the input interfaces are positioned at different areas. Accordingly, when NFC communication is performed in a state in which the respective external NFC devices are aligned with the first area 1 and the second area 2 of the NFC device 400, the input interfaces may not be blocked by the external NFC devices, and the external NFC devices may be prevented from causing any inconvenience to the user inputs for the input interfaces.

As described above with reference to FIG. 2, the respective RF antennas and input interfaces may be connected to one single processor. In this case, if user inputs for the input interfaces are detected in a communication mode, the processor can transmit, to the external NFC devices through loop antennas, RF response signals including control information for executing functions corresponding to the input interfaces.

For example, if a user input for the first input interface 431 associated with the first loop antenna 421 is detected in a communication mode, the processor of the NFC device 400 can transmit, to a first external NFC device through a first loop antenna 421, a first RF response signal including control information for executing a predefined function (e.g., a function corresponding to the first input interface 431). Here, the processor may or may not transmit to the second external NFC device 400 through the second loop antenna 422, a second RF response signal including the same first control information in accordance with a predetermined interoperation mode. Here, the interoperation mode may be a mode indicating whether NFC communication (or NFC service) provided by the NFC device 400 through the first loop antenna 421 and NFC communication (or NFC service) provided by the NFC device 400 through the second loop antenna 422 are interoperated with each other. In an embodiment, the interoperation mode may include a first interoperation mode in which two NFC communications are not interoperated with each other, and a second interoperation mode in which two NFC communications are interoperated with each other. In an embodiment, the first interoperation mode may be selected as a default interoperation mode.

In an embodiment, if the interoperation mode is the first interoperation mode, when the first RF response signal including first control information is transmitted to the first external NFC device, the NFC device 400 may not transmit the second RF response signal including the same first control information to the second external NFC device. As a result, the first external NFC device and the second external NFC device may execute different functions. As a result, the NFC device 400 may separately provide a user of the first external NFC device and a user of the second external NFC device with different NFC services that are not interoperated with each other.

In another embodiment, if the interoperation mode is the second interoperation mode, when the first RF response signal including the first control information is transmitted to the first external NFC device, the NFC device 400 may transmit the second RF response signal including the same first control information to the second external NFC device. As a result, the first external NFC device and the second external NFC device may execute the same function. As a result, the NFC device 400 may concurrently provide the user of the first external NFC device and the user of the second external NFC device with interoperating NFC services.

FIG. 5 illustrates example types of a loop antenna according to an embodiment of the present invention. As described above, the loop antenna may be implemented as a coil having one or more turns. Here, the coil implementing the loop antenna may have various shapes. For example, as shown in FIG. 5(*a*), the loop antenna may be constructed by a rectangular coil having one or more turns. Additionally, as shown in FIG. 5(*b*), the loop antenna may be constructed by a triangular coil having one or more turns. Moreover, as shown in FIG. 5(*c*), the loop antenna may be constructed by a circular coil having one or more turns. In addition, as shown in FIG. 5(*d*), the loop antenna may be constructed by an elliptical coil having one or more turns.

As described above, the loop antenna of the NFC device may have various shapes. However, in consideration of the shape of the loop antenna of the external NFC device, the shape of the antenna having the maximum antenna efficiency may be selected as the antenna shape of the NFC device. For example, if the external NFC device is a mobile device, such as a smart phone having a rectangular loop antenna, the rectangular loop antenna having maximum antenna efficiency (e.g., the example loop antenna shown in FIG. 5(*a*)) may be selected as the loop antenna of the NFC device.

Hereinafter, layout structures and configurations of loop antennas will be described with regard to cases where the NFC device includes one single loop antenna and the loop antenna has a rectangular shape with reference to FIGS. 6 and 7, which are, however, provided just by way of examples for better understanding of the invention. Identical or similar descriptions may be applied to an embodiment in which the NFC device includes multiple loop antennas and other embodiments in which the loop antenna has different shapes.

FIG. 6 illustrates example layout structures of a loop antenna according to an embodiment of the present invention. As described above, the loop antenna 610 may be disposed on a first surface of a board, and an antenna area of the loop antenna 610 may be positioned within a first area 10 on the first surface of the board. However, as shown in FIG. 6, the location of the antenna area in the first area may implemented as various embodiments.

For example, as shown in FIG. 6A, the antenna area of the loop antenna 610 may be positioned at the center of the first area 10. In addition, as shown in FIG. 6B, the antenna area of the loop antenna 610 may be positioned at an upper part of the first area 10. In this case, the antenna area of the loop antenna 610 may overlap more with an upper half area of the first area 10 than with a lower half area of the first area 10. Moreover, as shown in FIG. 6C, the antenna area of the loop antenna 610 may be positioned at a lower part of the first area 10. In this case, the antenna area of the loop antenna 610 may overlap more with the lower half area of the first area 10 than with the upper half area of the first area 10. Additionally, as shown in FIG. 6D, the antenna area of the loop antenna 610 may be positioned at a left part of the first area 10. In this case, the antenna area of the loop antenna 610 may overlap more with a left half area of the first area 10 than with a right half area of the first area 10. In addition, as shown in FIG. 6E, the antenna area of the loop antenna 610 may be positioned at a right part of the first area 10. In this case, the antenna area of the loop antenna 610 may overlap more with the right half area of the first area 10 than with the left half area of the first area 10.

As described above, the loop antenna 610 of the NFC device 600 may be implemented at various locations in the first area 10. However, in consideration of locations of the loop antenna of the external NFC device aligned with the first area 10, the location of the loop antenna 610 at which the antenna efficiency is highest may be selected as the location of the loop antenna 610 of the NFC device 600. For example, if the external NFC device is a mobile device, such as a smart phone including a loop antenna having the external NFC device typically positioned at the upper part of the first area 10, the loop antenna having maximum antenna efficiency (e.g., the example loop antenna 610 shown in FIG. 6B) may be selected as the loop antenna 610 of the NFC device 600. Accordingly, when the external NFC device is positioned in proximity to the NFC device 600 (e.g., at the upper part of the first surface of the NFC device 600) in a state in which the external NFC device is aligned with the first area 10, the efficiency of communication between the NFC device 600 and the external NFC device, can be increased.

FIG. 7 illustrates example configurations of a loop antenna according to an embodiment of the present invention. As described above, the loop antenna 710 may be disposed on a first surface of a board, and an antenna area of the loop antenna 710 may be positioned within a first area 10 on the first surface of the board. However, like in FIG. 7, the antenna area of the loop antenna 710 may not be aligned with the first area 10.

In an embodiment, a central axis of the first area 10 may be aligned with a reference axis, and a central axis of the antenna area may be tilted a predetermined angle relative to the reference axis. In an embodiment, the predetermined angle is experimentally determined in consideration of antenna efficiency. For example, the predetermined angle may range from 0 to 45 degrees, preferably from 5 to 40 degrees. Here, the reference axis may be an axis parallel or perpendicular to one of x-axis, y-axis and edges of the first area 10. In addition, the central axis of the first area 10 may pass the center of the first area 10 and may be an axis parallel or perpendicular to one of the edges of the first area 10. In addition, the central axis of the antenna area may pass the center of the antenna area and may be an axis parallel or perpendicular to one of the edges of the antenna area.

In a case when the antenna area is arrayed in the first area 10 with the same size and the same location as shown in FIG. 7, when the central axis of the antenna area is tilted by the predetermined angle with respect to the reference axis, the antenna efficiency can be increased compared to a case where the central axis of the antenna area is aligned with the reference axis, like in FIG. 6. Accordingly, when the external NFC device is positioned in proximity to the NFC device 700 in a state in which the external NFC device is aligned with the first area 10, the efficiency of communication between the NFC device 700 and the external NFC device, can be increased.

In the embodiments shown in FIGS. 7A to 7C, assumptions are made that the reference axis is the x-axis, the central axis of the first area 10 passes the center of the first area 10 and is parallel with horizontal edges of the first area 10, and the central axis of the antenna area passes the center of the antenna area and is parallel with vertical edges of the first area 10. In addition, in the embodiments shown in FIGS. 7A to 7C, an assumption is made that the antenna area is defined by the outer perimeter of the loop antenna 710.

For example, as shown in FIG. 7A, the central axis of the first area 10 may be parallel with the reference axis, and the central axis of the antenna area may not be parallel with the reference axis and may be tilted a first predetermined angle relative to the reference axis. That is to say, the central axis of the first area 10 may be aligned with the reference axis, and the central axis of the antenna area may not be aligned with the reference axis. Here, the tilted antenna area, as shown in FIG. 6A, may be positioned at the center of the first area 10. That is to say, areas of the antenna area overlapping with a lower half area and an upper half area of the first area 10 may be identical.

For another example, as shown in FIG. 7B, the central axis of the first area 10 may be parallel with respect to the reference axis, and the central axis of the antenna area may not be parallel with respect to the reference axis but may be tilted the first predetermined angle relative to the reference axis. That is to say, the central axis of the first area 10 may be aligned with the reference axis, and the central axis of the antenna area may not be aligned with the reference axis. Here, the tilted antenna area, as shown in FIG. 6B, may be positioned at an upper part of the first area 10. That is to say, the antenna area may overlap more with the upper half area of the first area 10 than with the lower half area of the first area 10.

For still another example, as shown in FIG. 7C, the central axis of the first area 10 may be parallel with the reference axis, and the central axis of the antenna area may not be parallel with the reference axis but may be tilted the first predetermined angle relative to the reference axis. That is to say, the central axis of the first area 10 may be aligned with the reference axis, and the central axis of the antenna area may not be aligned with the reference axis but may be tilted the predetermined angle relative to the reference axis. Here, the tilted antenna area, as shown in FIG. 6C, may be positioned at a lower part of the first area 10. That is to say, the antenna area may overlap more with the lower half area of the first area 10 than with the upper half area of the first area 10.

In the embodiments shown in FIGS. 7D and 7E, assumptions are made that the reference axis is the y-axis, the central axis of the first area 10 passes the center of the first area 10 and is parallel with vertical edges of the first area 10, and the central axis of the antenna area passes the center of the antenna area and is parallel with horizontal edges of the first area 10. In addition, in the embodiments shown in FIGS. 7D and 7E, an assumption is made that the antenna area is defined by the inner perimeter of the loop antenna 710.

For example, as shown in FIG. 7D, the central axis of the first area 10 may be parallel with the reference axis, and the central axis of the antenna area may not be parallel with the reference axis and may be tilted a second predetermined angle relative to the reference axis. That is to say, the central axis of the first area 10 may be aligned with the reference axis, and the central axis of the antenna area may not be aligned with the reference axis. Here, the tilted antenna area, as shown in FIG. 6D, may be positioned at the right part of the first area 10. That is to say, the antenna area may overlap more with the right half area of the first area 10 than with the left half area of the first area 10.

For still another example, as shown in FIG. 7E, the central axis of the first area 10 may be parallel with the reference axis, and the central axis of the antenna area may not be parallel with the reference axis and may be tilted the second predetermined angle relative to the reference axis. That is to say, the central axis of the first area 10 may be aligned with the reference axis, and the central axis of the antenna area may not be aligned with the reference axis but may be tilted the second predetermined angle relative to the reference axis. Here, the tilted antenna area, as shown in FIG. 6E, may be positioned at a left part of the first area 10. That is to say, the antenna area may overlap more with the left half area of the first area 10 than with the right half area of the first area 10.

As described above, the loop antenna 710 of the NFC device 700 may have a tilted configuration in the first area 10. However, in consideration of the location and configuration of the loop antenna of the external NFC device aligned with the first area 10, the tilted configuration of the loop antenna 710 having maximum antenna efficiency may be selected as the layout structure of the loop antenna 710 of the NFC device. For example, if the external NFC device is a mobile device, such as a smart phone including a rectangular loop antenna having the external NFC device typically positioned at the upper part of the first area 10, the rectangular loop antenna having maximum antenna efficiency and having the configuration tilted by the predetermined angle (e.g., the example loop antenna 710 shown in FIG. 7B) may be selected as the loop antenna 710 of the NFC device 700. Accordingly, when the external NFC device is positioned in proximity to the NFC device 700 (e.g., at the upper part of the first surface of the NFC device 700) in a state in which the external NFC device is aligned with the first area 10, the efficiency of communication between the NFC device 700 and the external NFC device, can be increased.

Although the embodiments shown in FIG. 7 have been described with regard to the loop antenna 710 configured to be tilted clockwise on the basis of the y-axis, with reference to FIGS. 6 and 7, this is provided just by way of example for better understanding of the invention. Identical or similar descriptions may be applied to the loop antenna 710 configured to be tilted counterclockwise on the basis of the y-axis.

FIG. 8 illustrates an operation mode of an NFC device according to an embodiment of the present invention. Referring to FIG. 8, the NFC device may have a standby mode 810 and a communication mode 820 as operation modes.

The standby mode 810 means a state in which the NFC device stands ready for communication with the external NFC device. For example, the standby mode 810 may be a state in which the NFC device awaits until an operating voltage is supplied from an RF signal received from the external NFC device. In the present disclosure, the standby mode 810 may be referred to as a target mode.

The communication mode 820 means a state in which the NFC device can communicate with the external NFC device. For example, the communication mode 820 may be a state in which the NFC device can receive an operating voltage is supplied from an RF signal received from the external NFC device to enable communication with the external NFC device.

In an embodiment, if the operating voltage is supplied through the RF signal received from the external NFC device, the NFC device may switch the operation mode from the standby mode 810 to the communication mode 820. In another embodiment, if receiving the RF signal from the external NFC device is interrupted or if a user input for the input interface is not detected for a predetermined period in a state in which the operating voltage is supplied through the RF signal received from the external NFC device, the NFC device may switch the operation mode from the communication mode 820 to the standby mode 810. However, the above-described embodiment is one of various examples for operation mode changing conditions, and the operation mode may be switched from the standby mode 810 to the communication mode 820 or from the communication mode 820 to the standby mode 810 by the various operation mode changing conditions determined by the user.

In an embodiment, in the communication mode 820, if the user input for the input interface is detected, the NFC device may transmit the RF response signal including control information for executing a predefined function to the external NFC device through the loop antenna. In an embodiment, the predefined function may vary according to the communication mode.

In an embodiment, the control information may include information for executing a Wi-Fi function of the external NFC device (Wi-Fi network information) or information for executing a content providing function through a display of the external NFC device (content providing information). The Wi-Fi network information may include, for example, Wi-Fi network ID information, Wi-Fi network PW information, Wi-Fi network address information and/or security option information. After receiving the control information including the Wi-Fi network information, the external NFC device may execute a Wi-Fi function. The content providing information may include, for example, application information used for providing content (e.g., web browser application information) and/or URL information for a webpage for providing content (e.g., URL type information, URL address information, etc.). After receiving the control information including the content providing information, the external NFC device may provide content through a web browser.

In an embodiment, the control information for executing a function corresponding to each input interface may be updated by the external NFC device in an administrator mode. For example, the NFC device may receive an RF signal including a write command including updated information from the external NFC device in the administrator mode to update the control information. As described above, the control information can be updated only by the external NFC device having an administrator right, thereby prohibiting an ill-intentioned user from wrongfully changing the control information.

In an embodiment, the communication mode 820 may include a first communication mode and a second communication mode. Here, the first communication mode is an general mode in which if a user input for each input interface is detected, for example, the NFC device transmits an RF response signal including control information for executing a function corresponding to each input interface to the external NFC device, irrespective of the function of an input interface of a previous user input (i.e., a preceding input interface). The second communication mode is an extended communication mode or an associated mode in which if a user input for each input interface is detected, for example, the NFC device transmits an RF response signal including control information for executing a function associated with the function of the preceding input interface to the external NFC device. In an embodiment, the first communication mode may be selected as a default communication mode. In the respective communication modes, operations of the NFC device according to the user input for each input interface will later be described with reference to FIGS. 12 to 15.

Hereinafter, a smart mat including an NFC device according to an embodiment of the present invention will first be described with reference to FIGS. 9 to 11, and operations of the NFC device and the smart mat will next be described in detail with reference to FIGS. 12 to 15.

FIG. 9 is a conceptual diagram of a smart mat including an NFC device according to an embodiment of the present invention. FIG. 10 is an exploded perspective view of the smart mat shown in FIG. 9. FIG. 11 illustrates an example method of utilizing an NFC service using the smart mat shown in FIG. 9.

Referring to FIG. 10, the smart mat 1000 includes an NFC device 1100, a guide board 1200, a base board 1300 and a fixed frame 1400. Since descriptions of the NFC device 1100 are the same as described above in FIGS. 1 to 8, a detailed description thereof will be omitted.

The guide board 1200 may be a board for guiding NFC communication between the external NFC device 100 and the NFC device 1100. In an embodiment, the guide board 1200 may be brought into contact with a first surface of a board of the NFC device 1100.

In an embodiment, the guide board 1200 may include at least one guide information for guiding NFC communication between the external NFC device 100 and the NFC device 1100. For example, the at least one guide information may include at least one of first guide information representing a device contact area corresponding to the first area of the NFC device 1100 and second guide information representing input areas corresponding to input interface areas of the NFC device 1100. The first guide information may be, for example, a mark line for indicating the device contact area and/or a guidance sentence for the device contact area (e.g., a guidance sentence for a location or direction of the device contact area where the external NFC device 100 is positioned). The second guide information may be, for example, a mark line for indicating the input area and/or an explanatory sentence for each input interface.

In an embodiment, as shown in FIG. 11, the NFC device 1100 may perform NFC communication with the external NFC device 100 in a state in which the external NFC device 100 is positioned on the device contact area of the guide board 1200. For example, the NFC device 1100 may perform NFC communication with the external NFC device 100 in a state in which the external NFC device 100 is positioned on the device contact area of the guide board 1200 to be aligned with the first area. As a result, the NFC device 1100 may efficiently perform NFC communication with the external NFC device 100.

The base board 1300 may be a board for accommodating the NFC device 1100. In an embodiment, the base board 1300 may be brought into contact with a second surface of the NFC device 1100. In this case, the first surface and the second surface of the NFC device 1100 (or the board of the NFC device 1100) are opposite direction surfaces.

The fixed frame 1400 may fix the NFC device 1100, the base board 1300 and the guide board 1200. The smart mat 1000 fixed by the fixed frame 1400 may have the same configuration as shown in FIG. 9. Here, the NFC device 1100 may not be exposed, while only a surface of the guide board 1200 and a surface of the base board 1300 are exposed. As described above, the surface of the guide board 1200 may provide a user with at least one piece of guide information.

In this case, as shown in FIG. 11, a user input for the input area may be received in a state in which the external NFC device 100 is positioned in the device contact area. In this case, the NFC device 1100 may detect the user input for the input interface of the input interface area corresponding to the input area and may transmit the RF response signal including control information for executing a predefined function (e.g., a function corresponding to the input interface) to the external NFC device 100.

FIG. 12 illustrates operating methods of an NFC device according to an embodiment of the present invention and a smart mat including the NFC device in various communication modes. In the embodiment shown in FIG. 12, the NFC device may operate in a first communication mode. Since the operating method of the smart mat is in conformity with that of the NFC device, the following description will focus on the operating method of the NFC device.

As shown in the left upper part of FIG. 12, in the first communication mode, if a user input for a first input interface (e.g., button a) is detected, the NFC device may transmit a first RF response signal including first control information for executing a first function (e.g., function A) corresponding to the first input interface to an external NFC device 100 through a loop antenna. In this case, the NFC device may deactivate an input interface during a first predetermined period (e.g., period t0-t1). Therefore, the NFC device cannot detect a user input for an input interface (e.g., button b) while the input interface is deactivated.

As described above, when transmitting the RF response signal for executing a function depending on the button input to the external NFC device 100, the NFC device may deactivate the input interface during a predetermined period for executing the function depending on the button input. As a result, the NFC device may prevent malfunction of the external NFC device 100 due to repeated inputs or unduly frequent inputs or may allow enough time for the external NFC device 100 to execute the corresponding function.

As shown in the left lower part of FIG. 12, after receiving the first RF response signal, the external NFC device 100 may execute the first function and may provide a user with an execution screen of the first function through a display.

Hereinafter, an embodiment, in which user inputs for input interfaces are detected during a second period, during a third period or after the third period, will be described with reference to the drawings of FIG. 12.

(1) As shown in the middle upper part of FIG. 12, in the first communication mode, if a user input for a second input interface (e.g., button b) is detected within a second predetermined period (e.g., period t1-t2) after the first predetermined period is elapsed (e.g., t1), the NFC device may transmit a second RF response signal including second control information for executing a second function corresponding to the second input interface to the external NFC device 100 through the loop antenna.

In this case, as shown in the middle lower part of FIG. 12, after receiving the second RF response signal, the external NFC device 100 may execute the second function and may provide the user with an execution screen of the second function through the display.

(2) In addition, as shown in the right upper part of FIG. 12, in the first communication mode, if a user input for a third input interface (e.g., button c) is detected within a second predetermined period (e.g., period t2-t3) after the second predetermined period is elapsed (e.g., t2), the NFC device may transmit a third RF response signal including third control information for executing a third function corresponding to the third input interface to the external NFC device 100 through the loop antenna.

In this case, as shown in the right lower part of FIG. 12, after receiving the third RF response signal, the external NFC device 100 may execute the third function and may provide the user with an execution screen of the third function through the display.

(3) In addition, in the first communication mode, if the user input for the input interface is not detected until the second period is elapsed (e.g., t3), the NFC device may switch the operation mode from the first communication mode to the standby mode.

In an embodiment, the first communication mode for executing the above-described operation may be a default communication mode.

FIG. 13 illustrates operating methods of an NFC device according to another embodiment of the present invention and a smart mat including the NFC device in various communication modes. In the embodiment shown in FIG. 13, the NFC device may operate in a second communication mode. Since the operating method of the smart mat is in conformity with that of the NFC device, the following description will focus on the operating method of the NFC device.

As shown in the left upper part of FIG. 13, in the second communication mode, if a user input for a first input interface (e.g., button a) is detected, the NFC device may transmit a first RF response signal including first control information for executing a first function (e.g., function A)

corresponding to the first input interface to an external NFC device 100 through a loop antenna.

In this case, the NFC device may deactivate the input interface during a first predetermined period (e.g., period t0-t1). Therefore, the NFC device cannot detect a user input for an input interface (e.g., button b) while the input interface is deactivated. As a result, the NFC device may prevent malfunction of the external NFC device 100 due to repeated inputs or unduly frequent inputs or may allow enough time for the external NFC device 100 to execute the corresponding function.

As shown in the left lower part of FIG. 13, after receiving the first RF response signal, the external NFC device 100 may execute the first function and may provide the user with an execution screen of the first function through a display.

Hereinafter, an embodiment, in which user inputs for input interfaces are detected during a second period, during a third period or after the third period, will be described with reference to the drawings of FIG. 13.

(1) As shown in the middle upper part of FIG. 13, in the second communication mode, in the first communication mode, if a user input for a second input interface (e.g., button a or b) is detected within a second predetermined period (e.g., period t1-t2) after the first predetermined period is elapsed (e.g., t1), the NFC device may transmit a second RF response signal including second control information for executing a first-first (1-1) function (e.g., function A-1 or A-2) associated with the first function to the external NFC device 100 through the loop antenna.

In this case, as shown in the middle lower part of FIG. 13, after receiving the second RF response signal, the external NFC device 100 may execute the first-first function associated with the first function and may provide the user with an execution screen of the first-first function through the display. In an embodiment, the first-first function associated with the first function may be a sub-function of the first function. For example, if the first function is a content providing function, the first-first function associated with the first function may be a function of providing sub-content or specific content of first content.

(2) In addition, as shown in the right upper part of FIG. 13, in the second communication mode, if a user input for the second input interface (e.g., button a or b) is detected within the second predetermined period (e.g., period t2-t3) after the second predetermined period is elapsed (e.g., t2), the NFC device may transmit a third RF response signal including third control information for executing a second function (e.g., function A or B) corresponding to the second input interface to the external NFC device 100 through the loop antenna.

In this case, as shown in the right lower part of FIG. 13, after receiving the third RF response signal, the external NFC device 100 may execute the second function and may provide the user with an execution screen of the second function through the display.

(3) In addition, in the second communication mode, if the user input for the input interface is not detected until the second period is elapsed (e.g., t3), the NFC device may switch the operation mode from the first communication mode to the standby mode.

In an embodiment, the first communication mode or the second communication mode may be selected or changed by user inputs for input interfaces. In this case, one of the input interfaces may be used as the input interface for selecting the communication mode.

As described above, the NFC device includes the first communication mode and the second communication mode as communication modes, thereby advantageously providing a variety of combinations of functions and information pieces using a limited number of buttons. In addition, the NFC device can advantageously provide more specific information step by step when providing particular content through the external NFC device 100.

Hereinafter, the operating method of an NFC device including a plurality of loop antennas according to an embodiment of the present invention in various interoperation modes will be described. In a first interoperation mode, since the operating method of the NFC device including the plurality of loop antennas each communicating with each external NFC device 100 through each loop antenna is the same with the above-described operating method of the NFC device operating according to the communication mode, additional descriptions will not be given. Therefore, the following description will focus on various example embodiments of the NFC device including the plurality of loop antennas operating in a second interoperation mode.

FIG. 14 illustrates operating methods of an NFC device including a plurality of loop antennas according to an embodiment of the present invention and a smart mat including the NFC device in various interoperation modes. In the embodiment shown in FIG. 14, the NFC device including the plurality of loop antennas may operate in the second interoperation mode. In addition, in the embodiment shown in FIG. 14, the NFC device may also operate in a first communication mode. Since the operating method of the smart mat is in conformity with that of the NFC device, the following description will focus on the operating method of the NFC device.

As shown in the left upper part of FIG. 14, in the second interoperation mode, if a user input for a first input interface (e.g., button 1-a) is detected, the NFC device may transmit an RF response signal including first control information for executing a first function (e.g., function 1-A) corresponding to the first input interface to the external NFC device through a first loop antenna.

Here, the NFC device may also transmit an RF response signal including the same first control information to a second external NFC device 102 through a second loop antenna. As a result, as shown in the left lower part of FIG. 14, the first external NFC device 101 and the second external NFC device 102 may execute the same function and may provide the respective users with an execution screen of the same function through a display of the first external NFC device 101 and a display of the second external NFC device 102.

In addition, the NFC device may deactivate the input interface during a first predetermined period (e.g., period t0-t1). Therefore, the NFC device cannot detect the user input for the input interface (e.g., button 1-b or 2-b) while the input interface is deactivated. As a result, the NFC device may prevent malfunction of the external NFC device due to repeated inputs or unduly frequent inputs or may allow enough time for the external NFC device to execute the corresponding function.

Hereinafter, an embodiment, in which user inputs for input interfaces are detected during a second period, during a third period or after the third period, will be described with reference to the drawings of FIG. 14.

(1) As shown in the middle upper part of FIG. 14, in the second interoperation mode and the first communication mode, if a user input for a second input interface (e.g., button 1-b or 2-b) is detected within a second predetermined period (e.g., period t1-t2) after the first predetermined period is elapsed (e.g., t1), the NFC device may transmit an RF response signal including second control information for executing a second function (e.g., function 1-B or 2-B) corresponding to the second input interface to the external NFC device through the first loop antenna.

Here, the NFC device may transmit an RF response signal including the same second control information to the second external NFC device 102 through the second loop antenna. As a result, as shown in the middle lower part of FIG. 14, the first external NFC device 101 and the second external NFC device 102 may execute the same function and may provide the respective users with execution screens of the display of the first external NFC device 101 and the display of the second external NFC device 102.

(2) In addition, as shown in the right upper part of FIG. 14, in the second interoperation mode and the first communication mode, if a user input for a third input interface (e.g., button 1-c or 2-c) is detected within a second predetermined period (e.g., period t2-t3) after the second predetermined period is elapsed (e.g., t2), the NFC device may transmit an RF response signal including third control information for executing a third function (e.g., function 1-C or 2-C) corresponding to the third input interface to the external NFC device through the first loop antenna.

Here, the NFC device may transmit an RF response signal including the same second control information to the second external NFC device 102 through the second loop antenna. As a result, as shown in the right lower part of FIG. 14, the first external NFC device 101 and the second external NFC device 102 may execute the same function and may provide the respective users with execution screens of the same function through the display of the first external NFC device 101 and the display of the second external NFC device 102.

(3) In addition, in the second interoperation mode and the first communication mode, if the user input for the input interface is not detected until the second period is elapsed (e.g., t3), the NFC device may switch the operation mode from the first communication mode to the standby mode.

As described above, in the second interoperation mode, the first external NFC device 101 and the second external NFC device 102 may execute the same function and may provide the respective users with execution screens of the same function through the display of the first external NFC device 101 and the display of the second external NFC device 102. As a result, the NFC device may concurrently provide the user of the first external NFC device 101 and the user of the second external NFC device 102 with interoperating NFC services.

FIG. 15 illustrates operating methods of an NFC device including a plurality of loop antennas according to another embodiment of the present invention and a smart mat including the NFC device in various interoperation modes. In the embodiment shown in FIG. 15, the NFC device including a plurality of loop antennas may operate in a second interoperation mode. In addition, in the embodiment shown in FIG. 15, the NFC device may also operate in a second communication mode. Since the operating method of the smart mat is in conformity with that of the NFC device, the following description will focus on the operating method of the NFC device.

As shown in the left upper part of FIG. 15, in the second interoperation mode, if a user input for a first input interface (e.g., button 1-a) is detected, the NFC device may transmit an RF response signal including first control information for executing a first function (e.g., function 1-A) corresponding to the first input interface to an external NFC device through a first loop antenna.

Here, the NFC device may also transmit an RF response signal including the same first control information to a second external NFC device 102 through a second loop antenna. As a result, as shown in the left lower part of FIG. 14, the first external NFC device 101 and the second external NFC device 102 may execute the same function and may provide the respective users with execution screens of the same function through a display of the first external NFC device 101 and a display of the second external NFC device 102.

In addition, the NFC device may deactivate the input interface during a first predetermined period (e.g., period t0-t1). Therefore, the NFC device cannot detect the user input for the input interface (e.g., button 1-a or 2-a) while the input interface is deactivated. As a result, the NFC device may prevent malfunction of the external NFC device due to repeated inputs or unduly frequent inputs or may allow enough time for the external NFC device to execute the corresponding function.

Hereinafter, an embodiment, in which user inputs for input interfaces are detected during a second period, during a third period or after the third period, will be described with reference to the drawings of FIG. 15.

(1) As shown in the middle upper part of FIG. 15, in the second interoperation mode and the second communication mode, if a user input for a second input interface (e.g., button 1-a or 1-b) is detected within a second predetermined period (e.g., period t1-t2) after the first predetermined period is elapsed (e.g., t1), the NFC device may transmit an RF response signal including first-first control information for executing a first-first function (e.g., function 1-A-1 or 1-A-2) associated with the first function to the external NFC device through the first loop antenna.

Here, the NFC device may also transmit an RF response signal including the same control information 1-1 to a second external NFC device 102 through a second loop antenna. As a result, as shown in the middle lower part of FIG. 14, the first external NFC device 101 and the second external NFC device 102 may execute the same function and may provide the respective users with execution screens of the same function through the display of the first external NFC device 101 and the display of the second external NFC device 102.

(2) In addition, as shown in the right upper part of FIG. 15, in the second interoperation mode and the second communication mode, if a user input for a second input interface (e.g., button 1-a or 2-a) is detected within a second predetermined period (e.g., period t2-t3) after the second predetermined period is elapsed (e.g., t2), the NFC device may transmit an RF response signal including second control information for executing a second function (e.g., function 1-c or 2-c) corresponding to the second input interface to the external NFC device through the first loop antenna.

Here, the NFC device may transmit the RF response signal including the same second control information to the second external NFC device 102 through the second loop antenna. As a result, as shown in the right lower part of FIG. 15, the first external NFC device 101 and the second external NFC device 102 may execute the same function and may provide the respective users with execution screens of the same function through the display of the first external NFC device 101 and the display of the second external NFC device 102.

(3) In addition, in the second interoperation mode and the second communication mode, if the user input for the input interface is not detected until the second period is elapsed (e.g., t3), the NFC device may switch the operation mode from the second communication mode to the standby mode.

As described above, in the second interoperation mode, the first external NFC device 101 and the second external NFC device 102 may execute the same function and may provide the respective users with execution screens of the same function through the display of the first external NFC device 101 and the display of the second external NFC device 102. As a result, the NFC device may concurrently provide the user of the first external NFC device 101 and the user of the second external NFC device 102 with interoperating NFC services.

FIG. 16 is a flow diagram illustrating an NFC communication method of an NFC device according to an embodiment of the present invention and a smart mat including the NFC device. Since the operating method of the smart mat is in conformity with that of the NFC device, the following description will focus on the operating method of the NFC device.

Referring to FIG. 16, the NFC communication method includes the step of detecting a user input for an input interface in a communication mode of the NFC device (S16100).

When the user input for the input interface is detected, the NFC communication method includes the step of the NFC device transmitting an RF response signal including control information for executing a predefined function to an external NFC device through a loop antenna (S16200). In an embodiment, the predefined function may vary according to the communication mode. For example, When the communication mode is a first communication mode, the predefined function may be a function corresponding to the input interface for which a user input is detected. When the communication mode is a second communication mode, the predefined function may be a function associated with a preceding function corresponding to a preceding input interface for which a user input is detected prior to the corresponding input interface (e.g., a sub-function or a specific function of the preceding function).

In an embodiment, prior to the step of detecting the user input for the input interface (S16100), the NFC communication method may further include the step of, if an operating voltage is supplied through an RF signal received from the external NFC device, switching an operation mode of the NFC device from a standby mode to the communication mode.

In an embodiment, the step of transmitting an RF response signal including control information for executing a predefined function to an external NFC device through a loop antenna (S16200) may further include the step of, in a first communication mode, if a user input for a second input interface is detected within a second predetermined period after the first predetermined period is elapsed, transmitting a second RF response signal including second control information for executing a second function corresponding to the second input interface is transmitted to the external NFC device through the loop antenna, which has been described above with reference to FIG. 12, and detailed descriptions thereof will be omitted.

In an embodiment, the step of transmitting an RF response signal including control information for executing a predefined function to an external NFC device through a loop antenna (S16200) may further include the step of, in a second communication mode, if the user input for the second input interface is detected within the second predetermined period after the first predetermined period is elapsed, transmitting a third RF response signal including third control information for executing a function associated with the first function to the external NFC device through the loop antenna, or in the second communication mode, if the user input for the second input interface is detected within a third predetermined period after the second predetermined period is elapsed, transmitting the second RF response signal including the second control information to the external NFC device through the loop antenna, which has been described above with reference to FIG. 13, and detailed descriptions thereof will be omitted.

In an embodiment, the first communication mode or the second communication mode may be selected or changed by the user input for the input interface. In an embodiment, a central axis of the first area may be aligned with a reference axis, and a central axis of the antenna area may be tilted a predetermined angle relative to the reference axis, which has been described above with reference to FIG. 7, and detailed descriptions thereof will be omitted. In an embodiment, the control information may include at least one of information for executing a Wi-Fi function of the external NFC device and information for executing a content providing function through a display of the external NFC device.

In the embodiments described above, elements and features of the present invention are combined in a predetermined form. The elements or features should be considered optional unless explicitly mentioned otherwise. Each of the elements or features can be implemented without being combined with other elements or features. In addition, some elements and/or features may be combined to configure an embodiment of the present invention. The sequence of the operations discussed in the embodiments of the present invention may be changed. Some elements or features of one embodiment may also be included in another embodiment, or may be replaced with corresponding elements or features from another embodiment. It is apparent that some claims for which the relationship of dependency therebetween is not explicitly stated may be combined to configure an embodiment or may be incorporated into a new claim through amendment after filing of this application.

Embodiments of the present invention may be implemented by various means such as, for example, hardware, firmware, software, or a combination thereof. When implemented by hardware, one embodiment of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, one embodiment of the present invention may be embodied as a module, a procedure, or a function that performs the functions or operations described above. Software code may be stored in a memory unit and executed by a processor. The memory unit may be located at the interior or exterior of the processor to transmit and receive data to and from the processor via various known means.

MODES FOR CARRYING OUT THE INVENTION

It will be understood by those skilled in the art that various variations and modifications can be made to the present invention without departing from the spirit and scope of the invention. Therefore, the present invention is intended to embrace variations and modifications provided within the appended claims and equivalency range thereof. Device and method inventions are all described in the present disclosure and all descriptions of the device and method inventions can be applied in complementary senses. Various embodiments of the present invention have been described in best modes for carrying out the present invention.

INDUSTRIAL APPLICABILITY

The present invention is applicable to fields of NFC communications. Various changes and modifications will be readily apparent to those skilled in the art without departing from the spirit or scope of the invention. Therefore, the present invention is intended to embrace the changes and modifications of the present invention provided within the scope and spirit being indicated by the following claims and equivalents thereof.

The invention claimed is:

1. A near field communication (NFC) device comprising:
a loop antenna disposed on a first surface of a substrate and transmitting and receiving a wireless signal, wherein an antenna area defined by the outer perimeter or the inner perimeter of the loop antenna is positioned within a first area on the first surface;
at least one input interface disposed on the first surface of the substrate, wherein the input interface is positioned within a second area on the first surface, and the first area and the second area are different from each other; and
a processor connected to the loop antenna and the input interface, wherein when a user input for the input interface is detected in a communication mode in which the processor can communicate with an external NFC device, the processor transmits, to the external NFC device through the loop antenna, an RF response signal including control information for executing a function corresponding to the input interface.

2. The NFC device of claim 1, wherein a central axis of the first area is aligned with a reference axis, and a central axis of the antenna area is tilted a predetermined angle relative to the reference axis.

3. The NFC device of claim 1, wherein when an operating voltage is supplied to the processor through an RF signal received from the external NFC device, the processor switches an operation mode of the NFC device from a standby mode to the communication mode.

4. The NFC device of claim 1, wherein when a user input for the first input interface is detected, the processor transmits, to the external NFC device through the loop antenna, a first RF response signal including first control information for executing a first function corresponding to the first input interface, and deactivates the input interface during a first predetermined period.

5. The NFC device of claim 4, wherein in a first communication mode, when a user input for a second input interface is detected within a second predetermined period after the first predetermined period is elapsed, a second RF response signal including second control information for executing a second function corresponding to the second input interface is transmitted to the external NFC device through the loop antenna.

6. The NFC device of claim 5, wherein in a second communication mode, when the user input for the second input interface is detected within the second predetermined period after the first predetermined period is elapsed, a third RF response signal including third control information for executing a function associated with the first function is transmitted to the external NFC device through the loop antenna; or in the second communication mode, when the user input for the second input interface is detected within a third predetermined period after the second predetermined period is elapsed, the second RF response signal including the second control information is transmitted to the external NFC device through the loop antenna.

7. The NFC device of claim 6, wherein the first communication mode or the second communication mode is selected or changed by the user input for the input interface.

8. The NFC device of claim 1, wherein the control information includes at least one of information for executing a Wi-Fi function of the external NFC device and information for executing a content providing function through a display of the external NFC device.

9. A smart mat including an NFC device, the smart mat comprising:
the NFC device performing NFC communication with an external NFC device;
a guide board providing at least one guide information for guiding NFC communication between the external NFC device and the NFC device;
a base board accommodating the NFC device; and
a fixed frame fixing the NFC device, the base board and the guide board, the NFC device comprising:
a loop antenna disposed on a first surface of a substrate and transmitting and receiving a wireless signal, wherein an antenna area defined by the outer perimeter or the inner perimeter of the loop antenna is positioned within a first area on the first surface;
at least one input interface disposed on the first surface of the substrate, wherein the input interface is positioned within a second area on the first surface, and the first area and the second area are different from each other; and
a processor connected to the loop antenna and the input interface, wherein when a user input for the input interface is detected in a communication mode in which the processor can communicate with the external NFC device, the processor transmits, to the external NFC device through the loop antenna, an RF response signal including control information for executing a function corresponding to the input interface, the guide board is brought into contact with the first surface of the board of the NFC device, and the base board is brought into contact with a second surface of the board of the NFC device, the first surface and the second surface are opposite direction surfaces.

10. The smart mat of claim 9, wherein a central axis of the first area is aligned with a reference axis, and a central axis of the antenna area is tilted a predetermined angle relative to the reference axis.

11. The smart mat of claim 9, wherein the at least one guide information includes at least one of first guide information representing a device contact area corresponding to the first area of the NFC device and second guide information representing an input area corresponding to input interface areas of the NFC device, and the NFC device performs NFC communication with the external NFC device in a state in which the external NFC device is positioned on the device contact area.

* * * * *